(12) United States Patent
Nakao et al.

(10) Patent No.: US 9,866,022 B2
(45) Date of Patent: Jan. 9, 2018

(54) POWER SUPPLY SYSTEM

(75) Inventors: Kunihiro Nakao, Osaka (JP); Koji Yakire, Osaka (JP); Tomoyuki Hirai, Osaka (JP); Satoshi Nagata, Tokyo (JP)

(73) Assignees: Osaka Gas Co., Ltd., Osaka (JP); Wind Engineering Center Co., Ltd., Tokyo (JP)

( * ) Notice: Subject to any disclaimer, the term of this patent is extended or adjusted under 35 U.S.C. 154(b) by 499 days.

(21) Appl. No.: 14/402,255

(22) PCT Filed: May 24, 2012

(86) PCT No.: PCT/JP2012/063339
§ 371 (c)(1),
(2), (4) Date: Apr. 9, 2015

(87) PCT Pub. No.: WO2013/175612
PCT Pub. Date: Nov. 28, 2013

(65) Prior Publication Data
US 2015/0207322 A1     Jul. 23, 2015

(51) Int. Cl.
*H02J 3/32* (2006.01)
*H02J 3/00* (2006.01)
(Continued)

(52) U.S. Cl.
CPC ............... *H02J 3/006* (2013.01); *H02J 3/32* (2013.01); *H02J 3/38* (2013.01); *H02J 3/46* (2013.01); *H02J 7/007* (2013.01); *H02J 7/0014* (2013.01); *H02J 7/0052* (2013.01); *H02M 5/42* (2013.01); *Y10T 307/344* (2015.04)

(58) Field of Classification Search
CPC ...... H02J 3/006; H02J 3/32; H02J 3/38; H02J 3/46; H02J 7/0014; H02J 7/0052; H02J 7/007; H02M 5/42; Y10T 307/344
See application file for complete search history.

(56) References Cited

U.S. PATENT DOCUMENTS

| 2011/0175443 A1* | 7/2011 | Koyanagi | ................ | H02J 3/32 |
| | | | | 307/21 |
| 2012/0173035 A1* | 7/2012 | Abe | ......................... | H02J 3/00 |
| | | | | 700/297 |

FOREIGN PATENT DOCUMENTS

| CA | 2746166 A1 | 9/2010 |
| CN | 101895115 A | 11/2010 |

(Continued)

*Primary Examiner* — Rexford Barnie
*Assistant Examiner* — Elim Ortiz
(74) *Attorney, Agent, or Firm* — The Webb Law Firm

(57) ABSTRACT

When an AC line of one local system and a power system are in a parallel-off state, a control device included in a power supply system causes local inverter devices of the local systems to operate in a parallel-off operation mode in which control is performed such that the voltage and frequency of power on the AC line is at a target voltage and a target frequency determined according to the state of charge of a power storage device. When a condition for switching to the connected state has been satisfied, the control device stops operation of the local inverter device in the parallel-off operation mode and causes a switch to the connected state by operating the interrupting device, and thereafter causes the local inverter device to operate in a charging operation mode used in charging the power storage device with supplementary power received from the power system.

20 Claims, 7 Drawing Sheets

(51) Int. Cl.
*H02J 3/38* (2006.01)
*H02J 3/46* (2006.01)
*H02J 7/00* (2006.01)
*H02M 5/42* (2006.01)

(56) References Cited

FOREIGN PATENT DOCUMENTS

| | | |
|---|---|---|
| CN | 201742093 U | 2/2011 |
| CN | 202009272 U | 10/2011 |
| CN | 102246383 A | 11/2011 |
| CN | 102427243 A | 4/2012 |
| JP | 2006174540 A | 6/2006 |
| JP | 200782278 A | 3/2007 |
| JP | 201161970 A | 3/2011 |
| JP | 201229541 A | 2/2012 |
| WO | 2010103650 A1 | 9/2010 |
| WO | 2011055186 A1 | 5/2011 |

* cited by examiner

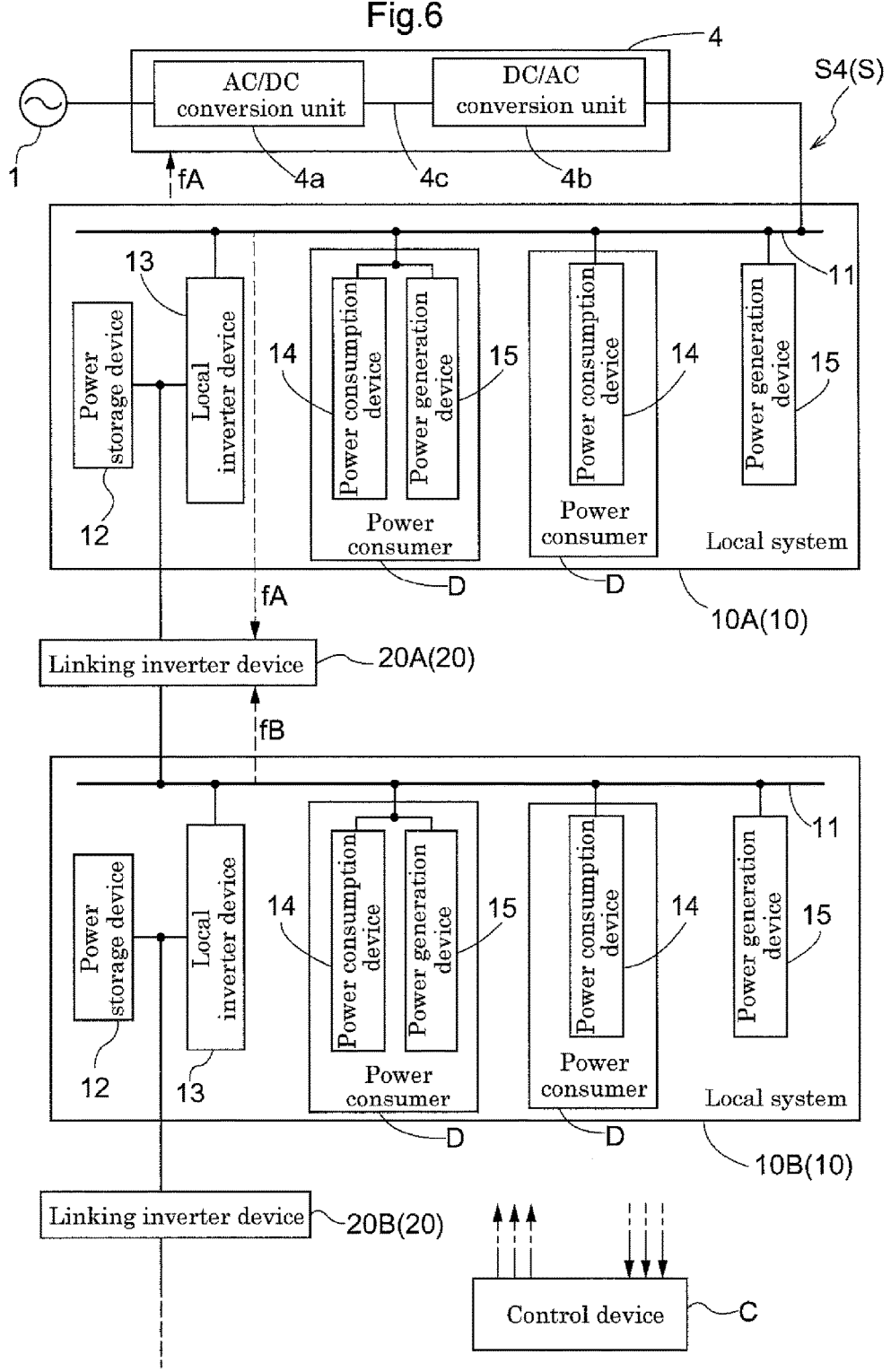

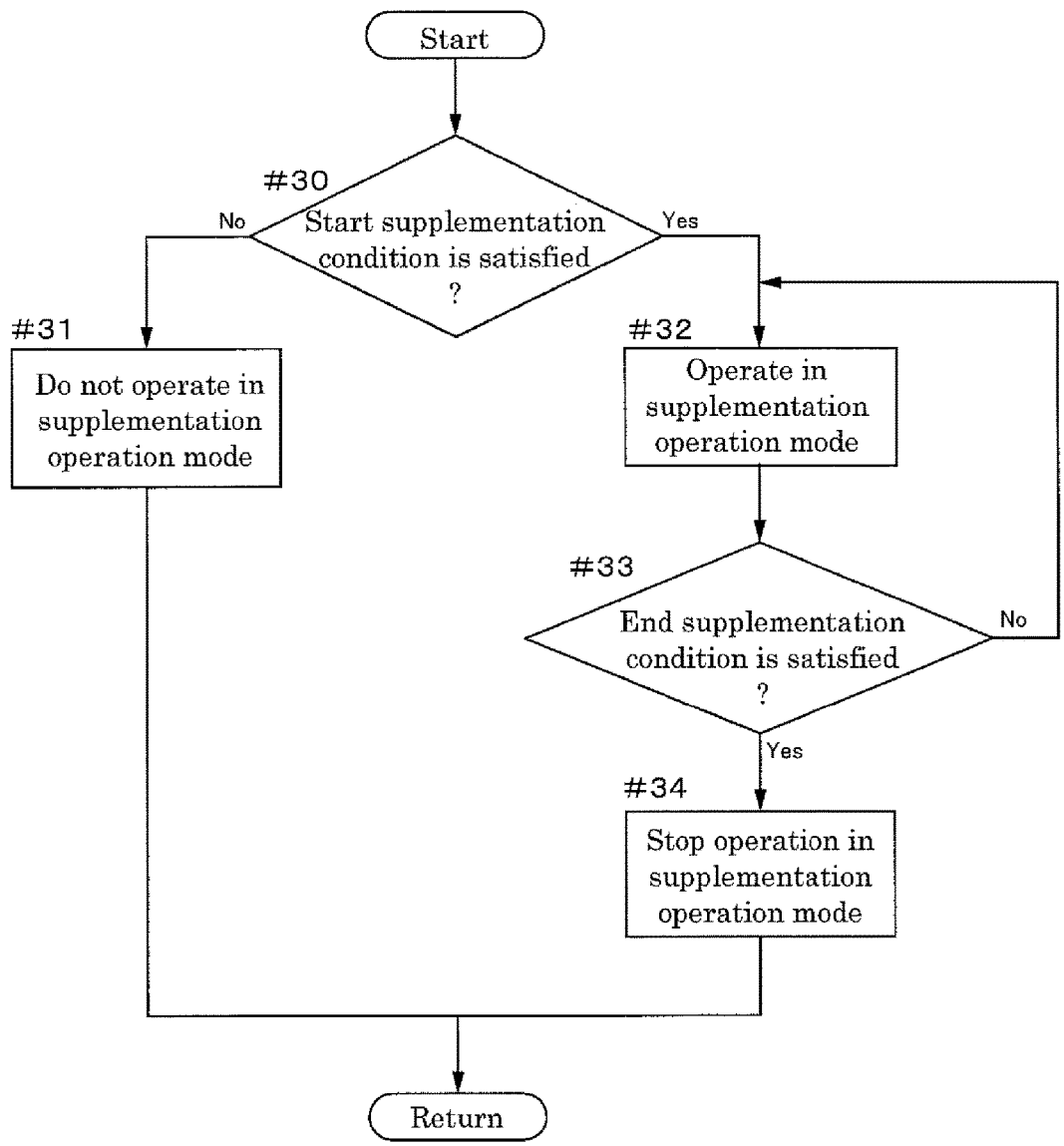

POWER SUPPLY SYSTEM

CROSS-REFERENCE TO RELATED APPLICATIONS

This application is the United States national phase of International Application No. PCT/JP2012/063339 filed May 24, 2012, the disclosure of which is hereby incorporated in its entirety by reference.

BACKGROUND OF THE INVENTION

Technical Field

The present invention relates to a power supply system that includes multiple local systems, each of which has an AC line to which multiple power consumers are connected, a power storage device, and a local inverter device that connects the power storage device and the AC line, and in this power supply system, a linking inverter device for linking the power storage device of one local system to the AC line of another local system is provided between the local systems such that the local systems are electrically connected in series.

Background Art

A power supply system that has been proposed in the past includes multiple local systems that each have an AC line to which multiple power consumers are connected, a power storage device, and a local inverter device that connects the power storage device and the AC line. For example, in the power supply system described in Patent Document 1 (WO 2010/103650), a linking inverter device for linking the power storage device of one local system to the AC line of another local system is provided between the local systems such that the local systems are electrically connected in series. Furthermore, the local inverter devices of the respective local systems are caused to operate such that the voltage of the power on the AC line is at a target voltage, and such that the frequency of the power on the AC line is at a target frequency determined according to the state of charge of the power storage device. Also, with respect to two local systems that are electrically connected via one linking inverter device, the operation of the linking inverter device is controlled such that electric power is supplied from the local system having the higher target frequency to the local system having the lower target frequency. In other words, the frequency of the power on the AC line in each local system is a value that reflects the state of charge of the power storage device, and therefore by merely detecting the frequencies of the AC lines of two local systems that are electrically connected, the linking inverter device can find out which local system has the power storage device with the higher state of charge. Power interchange is then performed between the local systems according to the magnitude relationship of the detected frequency values, thus making it possible to equalize the states of charge of the power storage devices in the local systems.

Patent Document 1: WO 2010/103650

SUMMARY OF THE INVENTION

In the power system described in Patent Document 1, each local system includes a power generation device, and is thus configured such that the power generated by the power generation device can be stored in the power storage device of the local system. However, it is not always the case that the power generated by the power generation device can be raised immediately after the state of charge of the power storage device has decreased, and even if the power generated by the power generation device can be immediately raised, it is not always the case that the power generated by the power generation device can sufficiently compensate for the amount of decrease in the state of charge of the power storage device. In other words, even if each local system includes a power generation device, there are cases where the state of charge of the power storage device continues to decrease. If the state of charge of the power storage device included in a local system is considered to be the amount of reserve power that can be supplied to the power consumers connected to the AC line of that local system, a state in which the state of charge of the power storage device has decreased can be said to be a state in which the amount of reserve power that can be supplied to the power consumers has decreased.

In light of the above-described problems, an object of the present invention is to provide a power supply system that includes multiple local systems and enables maintaining a high amount of reserve power that can be supplied to the power consumers.

A characteristic configuration of a power supply system according to the present invention for achieving the above-described object is a power supply system having a plurality of local systems that each have an AC line to which a plurality of power consumers are connected, a power storage device, and a local inverter device that connects the power storage device and the AC line, and having a linking inverter device that connects the power storage device of one local system and the AC line of another local system between the local systems such that the plurality of local systems are electrically connected in series, the power supply system including: an interrupting device capable of switching the AC line of one local system among the plurality of local systems and an external power system to one of a connected state and a parallel-off state; and a control device capable of controlling operation of the local inverter devices, the linking inverter device, and the interrupting device, wherein when the AC line of the local system that can be connected to the power system via the interrupting device and the power system are in the parallel-off state, the control device causes the local inverter device of each of the plurality of local systems to operate in a parallel-off operation mode in which control is performed such that the voltage of power on the AC line is at a target voltage and such that the frequency of power on the AC line is at a target frequency determined according to the state of charge of the power storage device, and if the control device determines that a condition for switching to the connected state has been satisfied, with respect to the local system that can be connected to the power system via the interrupting device, the control device stops operation of the local inverter device in the parallel-off operation mode and causes a switch to the connected state by operating the interrupting device, and thereafter causes the local inverter device to operate in a charging operation mode used in charging the power storage device with supplementary power received from the power system.

According to the above characteristic configuration, when the condition for switching to the connected state is satisfied, the AC line of the local system and the power system are connected to each other, and the local inverter device is caused to operate in the charging operation mode, thus making it possible to receive a necessary amount of supplementary power from the power system and charge the power storage device. Also, since the local systems are electrically connected by the linking inverter device provided between the local systems, the supplementary power received from the power system by one local system can be supplied to the other local system. As a result, a local system that received a supply of supplementary power from another local system can charge the electrical storage device using the supplied power. Accordingly, the amount of reserve power that can be supplied to the power consumers can be increased in the power supply system that includes multiple local systems.

In another characteristic configuration of the power supply system according to the present invention, the control device determines that the condition for switching to the connected state has been satisfied if a set time is reached.

According to the above characteristic configuration, it is possible to periodically determine that the condition for switching to the connected state has been satisfied at the set time, and charge the power storage device with supplementary power received from the power system. For example, if the set time is set before a time period in which power demand rises in a day, it is determined that the condition for switching to the connected state has been satisfied before the time period in which power demand rises, and the power storage device is charged with the supplementary power. As a result, it is possible to increase the amount of reserve power that can be supplied to power consumers before the time period in which power demand rises.

In yet another characteristic configuration of the power supply system according to the present invention, the control device determines that the condition for switching to the connected state has been satisfied if the state of charge of the power storage device of the local system that can be connected to the power system via the interrupting device is less than a lower limit state of charge.

According to the above characteristic configuration, it is possible to determine that the condition for switching to the connected state has been satisfied when the state of charge of the power storage device falls below the lower limit state of charge, that is to say when the amount of reserve power that can be supplied to power consumers from the power storage device has decreased, and to charge the power storage device with electric power from the power system. Also, it is possible to construct a system in which the power storage device is charged with supplementary power from the power system only when the state of charge of the power storage device has fallen below the lower limit state of charge, that is to say when it has become necessary to charge the power storage device.

In still another characteristic configuration of the power supply system according to the present invention, the control device changes the amount of supplementary power that the local inverter device is to receive from the power system in the charging operation mode in accordance with the magnitude of the state of charge of the power storage device of the local system that can be connected to the power system via the interrupting device at the time when the control device determined that the condition for switching to the connected state has been satisfied.

According to the above characteristic configuration, as the control device increases the amount of supplementary power that the local inverter device receives from the power system in the charging operation mode, the time needed for the state of charge of the power storage device to reach the fully charged level becomes relatively shorter. In other words, by changing the amount of supplementary power that the local inverter device receives from the power system in the charging operation mode in accordance with the magnitude of the state of charge of the power storage device of the local system, the control device can change the amount of time needed for the state of charge of the power storage device to reach the fully charged level.

In still another characteristic configuration of the power supply system according to the present invention, when the local inverter device is being caused to operate in the charging operation mode, the control device increases the amount of power transmitted by the linking inverter device between two adjacent local systems as the amount of supplementary power increases.

According to the above characteristic configuration, when the local system that can be connected to the power system via the interrupting device has received supplementary power from the power system, the amount of electric power that the other local system receives via the linking inverter device increases as the amount of received supplementary power increases. As a result, due to receiving supplementary power from the power system, it is possible to increase the state of charge of the power storage device of the local system that can be connected to the power system via the interrupting device, and it is also possible to increase the state of charge of the power storage device of the other local system as well.

Still another characteristic configuration of the power supply system according to the present invention is a power supply system having a plurality of local systems that each have an AC line to which a plurality of power consumers are connected, a power storage device, and a local inverter device that connects the power storage device and the AC line, and having a linking inverter device that connects the power storage device of one local system and the AC line of another local system between the local systems such that the plurality of local systems are electrically connected in series, the power supply system including: a charging inverter device that connects the power storage device of one local system among the plurality of local systems and an external power system, and can be used in charging of the power storage device with supplementary power received from the power system; and a control device that controls operation of the local inverter devices, the linking inverter device, and the charging inverter device, wherein the control device controls the local inverter device of each of the plurality of local systems such that the voltage of power on the AC line is at a target voltage and such that the frequency of power on the AC line is at a target frequency determined according to the state of charge of the power storage device, and if the control device determines that a condition for starting charging has been satisfied, the control device causes the charging inverter device to operate in a charging operation mode in which the supplementary power is received from the power system and used to charge the power storage device.

According to the above characteristic configuration, by causing the charging inverter device to operate in the charging operation mode when the condition for starting charging has been satisfied, it is possible to receive a necessary amount of supplementary power from the power system and charge the power storage device. Also, since the local systems are electrically connected by the linking inverter device provided between the local systems, the supplementary power received from the power system by one local system can be supplied to the other local system. As a result, a local system that received a supply of supplementary power from another local system can charge the electrical storage device using the supplied power. Accordingly, the amount of reserve power that can be supplied to the power consumers can be increased in the power supply system that includes multiple local systems.

In still another characteristic configuration of the power supply system according to the present invention, the control device determines that the condition for starting charging has been satisfied if a set time is reached.

According to the above characteristic configuration, it is possible to periodically determine that the condition for starting charging has been satisfied at the set time, and charge the power storage device with supplementary power received from the power system. For example, if the set time is set before a time period in which power demand rises in a day, it is determined that the condition for starting charging has been satisfied before the time period in which power demand rises, and the power storage device is charged with the supplementary power. As a result, it is possible to increase the amount of reserve power that can be supplied to power consumers before the time period in which power demand rises.

In still another characteristic configuration of the power supply system according to the present invention, the control device determines that the condition for starting charging has been satisfied if the state of charge of the power storage device of the local system connected to the power system via the charging inverter device is less than a lower limit state of charge.

According to the above characteristic configuration, it is possible to determine that the condition for starting charging has been satisfied when the state of charge of the power storage device falls below the lower limit state of charge, that is to say when the amount of reserve power that can be supplied to power consumers from the power storage device has decreased, and to charge the power storage device with electric power from the power system. Also, it is possible to construct a system in which the power storage device is charged with supplementary power from the power system only when the state of charge of the power storage device has fallen below the lower limit state of charge, that is to say when it has become necessary to charge the power storage device.

In still another characteristic configuration of the power supply system according to the present invention, the control device changes the amount of supplementary power that the charging inverter device is to receive from the power system in the charging operation mode in accordance with the magnitude of the state of charge of the power storage device of the local system connected to the power system via the charging inverter device at the time when the control device determined that the condition for starting charging has been satisfied.

According to the above characteristic configuration, as the control device increases the amount of supplementary power that the charging inverter device receives from the power system in the charging operation mode, the time needed for the state of charge of the power storage device to reach the fully charged level becomes relatively shorter. In other words, by changing the amount of supplementary power that the charging inverter device receives from the power system in the charging operation mode in accordance with the magnitude of the state of charge of the power storage device of the local system, the control device can change the amount of time needed for the state of charge of the power storage device to reach the fully charged level.

In still another characteristic configuration of the power supply system according to the present invention, when the charging inverter device is being caused to operate in the charging operation mode, the control device increases the amount of power transmitted by the linking inverter device between two adjacent local systems as the amount of supplementary power increases.

According to the above characteristic configuration, when the local system that can be connected to the power system via the charging inverter device has received supplementary power from the power system, the amount of electric power that the other local system receives via the linking inverter device increases as the amount of received supplementary power increases. As a result, due to receiving supplementary power from the power system, it is possible to increase the state of charge of the power storage device of the local system that can be connected to the power system via the charging inverter device, and also possible to increase the state of charge of the power storage device of the other local system as well.

Still another characteristic configuration of the power supply system according to the present invention is a power supply system having a plurality of local systems that each have an AC line to which a plurality of power consumers are connected, a power storage device, and a local inverter device that connects the power storage device and the AC line, and having a linking inverter device that connects the power storage device of one local system and the AC line of another local system between the local systems such that the plurality of local systems are electrically connected in series, the power supply system including: a power conversion device that connects the AC line of one local system among the plurality of local systems and an external power system; and a control device capable of controlling operation of the local inverter devices, the linking inverter device, and the power conversion device, wherein the control device controls the local inverter device of each of the plurality of local systems such that the voltage of power on the AC line is at a target voltage and such that the frequency of power on the AC line is at a target frequency determined according to the state of charge of the power storage device, and if the control device determines that a condition for starting supplementation has been satisfied, the condition for starting supplementation being for starting supply of supplementary power received from the power system to the AC line of the one local system, the control device causes the power conversion device to operate in a supplementation operation mode in which supplementary power is received from the power system, the frequency of the supplementary power is adjusted to the target frequency, and the adjusted supplementary power is supplied to the AC line.

According to the above characteristic configuration, when the condition for starting supplementation, in which supplementary power is supplied to the AC line of one local system, is satisfied, the power conversion device is caused to operate in the supplementation operation mode, thus making it possible to receive a necessary amount of supplementary power from the power system and charge the power storage device. Also, since the local systems are electrically connected by the linking inverter device provided between the local systems, the supplementary power received from the power system by one local system can be supplied to the other local system. As a result, in a local system that received the supplementary power from another local system, the power storage device can be charged with the supplied power. Furthermore, due to the power conversion device receiving supplementary power from the power system, adjusting the frequency of the supplementary power to the target frequency, and supplying the adjusted supplementary power to the AC line, it is possible to prevent fluctuation of the target frequency being controlled by the local inverter device in accordance with the state of charge of the power storage device. As a result, even while a supply of supplementary power is being received from the power system, it is possible to ensure that the frequency of the power on the AC line is a value that reflects the state of charge of the power storage device. Accordingly, the amount of reserve power that can be supplied to the power consumers can be increased in the power supply system that includes multiple local systems.

In still another characteristic configuration of the power supply system according to the present invention, the control device determines that the condition for starting supplementation has been satisfied if a set time is reached.

According to the above characteristic configuration, it is possible to periodically determine that the condition for starting supplementation has been satisfied at the set time, and charge the power storage device with supplementary power received from the power system. For example, if the set time is set before a time period in which power demand rises in a day, it is determined that the condition for starting supplementation has been satisfied before the time period in which power demand rises, and the power storage device is charged with the supplementary power. As a result, it is possible to increase the amount of reserve power that can be supplied to power consumers before the time period in which power demand rises.

In still another characteristic configuration of the power supply system according to the present invention, the control device determines that the condition for starting supplementation has been satisfied if the state of charge of the power storage device of the local system connected to the power system via the power conversion device is less than a lower limit state of charge.

According to the above characteristic configuration, it is possible to determine that the condition for starting supplementation has been satisfied when the state of charge of the power storage device falls below the lower limit state of charge, that is to say when the amount of reserve power that can be supplied to power consumers from the power storage device has decreased, and to charge the power storage device with electric power from the power system. Also, it is possible to construct a system in which the power storage device is charged with supplementary power from the power system only when the state of charge of the power storage device has fallen below the lower limit state of charge, that is to say when it has become necessary to charge the power storage device.

In still another characteristic configuration of the power supply system according to the present invention, the power conversion device has an AC/DC conversion unit that converts the supplementary power supplied from the power system into desired DC power, a DC/AC conversion unit that converts the DC power generated by the AC/DC conversion unit into desired AC power and supplies the AC power to the AC line, and a DC connection unit that connects the AC/DC conversion unit and the DC/AC conversion unit.

According to the above characteristic configuration, the AC/DC conversion unit can convert the supplementary power supplied from the power system into desired DC power, and the DC/AC conversion unit can convert the DC power into AC power having the target frequency and supply the resulting AC power to the AC line.

In still another characteristic configuration of the power supply system according to the present invention, the control device changes the amount of supplementary power that the power conversion device is to receive from the power system in the supplementation operation mode in accordance with the magnitude of the state of charge of the power storage device of the local system connected to the power system via the power conversion device at the time when the control device determined that the condition for starting supplementation has been satisfied.

According to the above characteristic configuration, as the control device increases the amount of supplementary power that the power conversion device receives from the power system in the supplementation operation mode, the time needed for the state of charge of the power storage device to reach the fully charged level becomes relatively shorter. In other words, by changing the amount of supplementary power that the power conversion device receives from the power system in the supplementation operation mode in accordance with the magnitude of the state of charge of the power storage device of the local system, the control device can change the amount of time needed for the state of charge of the power storage device to reach the fully charged level.

In still another characteristic configuration of the power supply system according to the present invention, when the power conversion device is being caused to operate in the supplementation operation mode, the control device increases the amount of power transmitted by the linking inverter device between two adjacent local systems as the amount of supplementary power increases.

According to the above characteristic configuration, when the local system that can be connected to the power system via the power conversion device has received supplementary power from the power system, the amount of electric power that the other local system receives via the linking inverter device increases as the amount of received supplementary power increases. As a result, due to receiving supplementary power from the power system, it is possible to increase the state of charge of the power storage device of the local system that can be connected to the power system via the power conversion device, and also possible to increase the state of charge of the power storage device of the other local system as well.

In still another characteristic configuration of the power supply system according to the present invention, a natural energy power generation device whose power generation changes according to the weather is connected to the AC line of at least one local system among the plurality of local systems, and the control device changes the magnitude of the lower limit state of charge according to the weather predicted for the future.

According to the above characteristic configuration, if a natural energy power generation device is connected to the AC line, power generated by the natural energy power generation device can be used to charge the power storage device. In other words, the power storage device can be charged with power generated by the natural energy power generation device, thus making it possible to reduce the amount of supplementary power received from the power system. Additionally, if the amount of power generated by the natural energy power generation device is predicted to be high in the future, it can be anticipated that it will be possible to charge the power storage device with a large amount of power generated by the natural energy power generation device in the future. For this reason, even if the state of charge of the power storage device is low, the large amount of generated power from the natural energy power generation device can be used to charge the power storage device, thus making it possible to restore the state of charge of the power storage device to a high level. In contrast, if the amount of power generated by the natural energy power generation device is predicted to be low in the future, it cannot be anticipated that it will be possible to charge the power storage device with a large amount of power generated by the natural energy power generation device in the future. For this reason, if the state of charge of the power storage device is low, it will not be possible to restore the state of charge of the power storage device to a high level with merely the power generated by the natural energy power generation device. Accordingly, if the control device changes the magnitude of the lower limit state of charge according to the weather predicted for the future, that is to say according to the magnitude of generated power from the natural energy power generation device that can be used to charge the power storage device, it is possible to restore the state of charge of the power storage device to a high level while effectively utilizing generated power from the natural energy power generation device to charge the power storage device.

In still another characteristic configuration of the power supply system according to the present invention, with respect to two mutually adjacent local systems that are electrically connected via one linking inverter device, the control device controls operation of the linking inverter device such that, based on the target frequencies determined according to the states of charge of the respective power storage devices, electric power is transmitted from the local system in which the state of charge of the power storage device is relatively higher to the local system in which the state of charge of the power storage device is relatively lower.

According to the above characteristic configuration, electric power is transmitted from the local system in which the state of charge of the power storage device is relatively higher to the local system in which the state of charge of the power storage device is relatively lower, thus making it possible to equalize the states of charge of the power storage devices in the local systems.

BRIEF DESCRIPTION OF THE DRAWINGS

FIG. 6 is a diagram illustrating a configuration of a power supply system according to a fourth embodiment.

FIG. 7 is a flowchart illustrating an example of control of the power supply system performed by the control device.

DETAILED DESCRIPTION OF THE INVENTION

Figure 1:
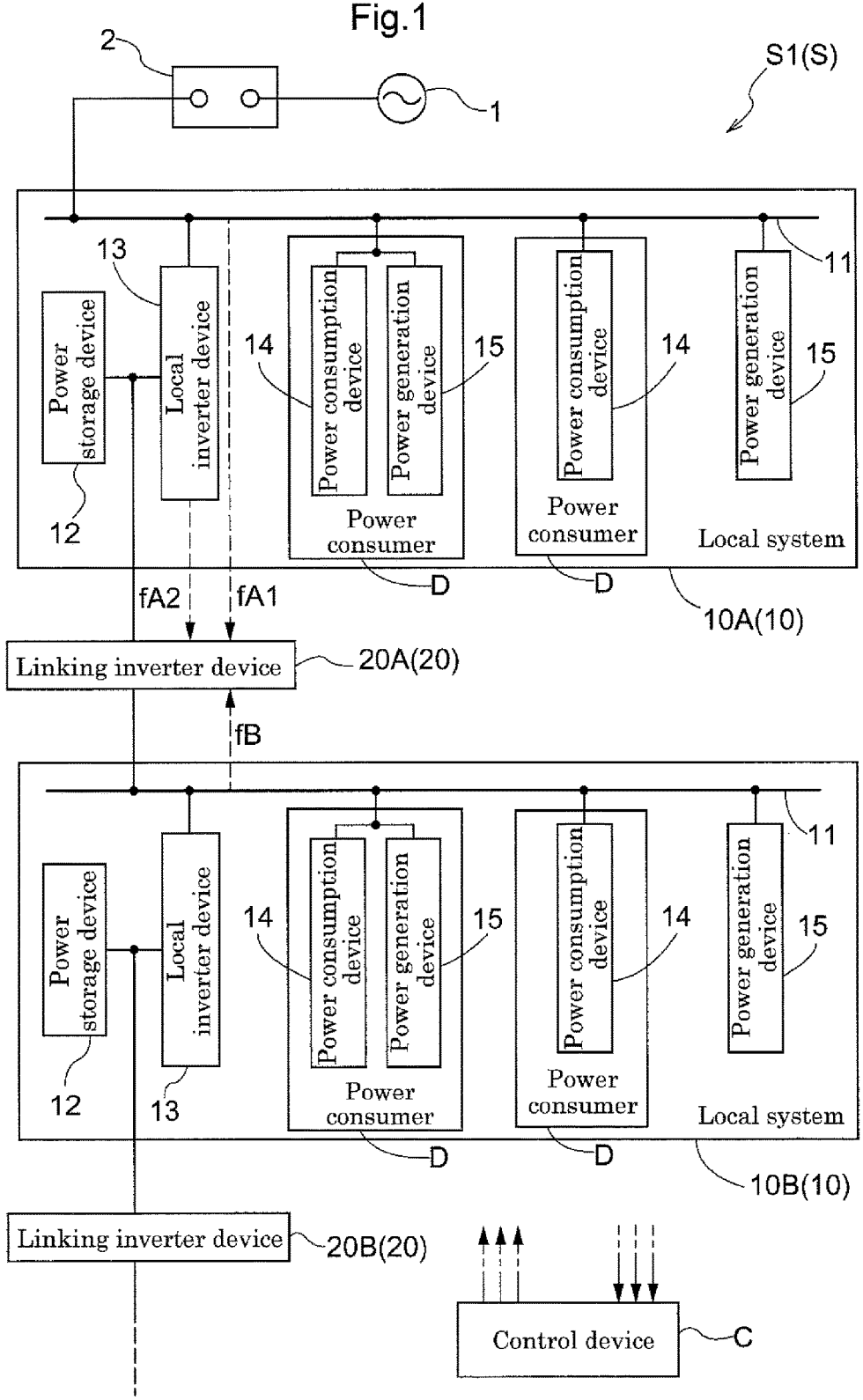
FIG. 1 is a diagram illustrating a configuration of a power supply system according to a first embodiment.

Power supply systems S1(S) to S4(S) of first to fourth embodiments described below have a common point in that they each include multiple local systems 10, each of which has an AC line 11 to which multiple power consumers D are connected, a power storage device 12, and a local inverter device 13 that connects the power storage device 12 and the AC line 11, and in each power supply system, linking inverter devices 20 for linking the power storage device 12 of one local system 10 to the AC line 11 of another local system 10 are provided between the local systems 10 such that the local systems 10 are electrically connected in series. Features of the power supply systems S1 to S4 will be described in detail below. The power supply systems S1(S) and S2(S) of the first and second embodiments are configured such that the AC line 11 is connected to a power system 1 via an interrupting device 2, and as a result, the power storage device 12 can receive supplementary power from the power system 1. The power supply system S3(S) of the third embodiment is configured such that the power storage device 12 is connected to the power system 1 via a charging inverter device 3, and as a result, the power storage device 12 can receive supplementary power from the power system 1. The power supply system S4(S) of the fourth embodiment is configured such that the AC line 11 is connected to the power system 1 via a power conversion device 4 that can perform AC/AC conversion, and as a result, the power storage device 12 can receive supplementary power from the power system 1.

First Embodiment

The following describes the power supply system S1(S) of the first embodiment with reference to the drawings. FIG. 1 is a diagram illustrating the configuration of the power supply system S1 according to the first embodiment.

As shown in FIG. 1, the power supply system S1 includes multiple local systems 10, linking inverter devices 20 provided between the local systems 10, an interrupting device 2, and a control device C. Although FIG. 1 shows an example in which the power supply system S1 includes local systems 10A and 10B and linking inverter devices 20A and 20B, it is possible to construct a system that includes an even greater number of local systems 10 and linking inverter devices 20. The interrupting device 2 is a device that can switch the AC line 11 of the local system 10A, which is one of the local systems 10, and an external power system 1 to either a connected state or a parallel-off state. In the present embodiment, the interrupting device 2 can switch the AC line 11 of the local system 10A and the external power system 1 to either the connected state or the parallel-off state. In other words, in the power supply system S1 shown in FIG. 1, only the local system 10A can be connected to the power system 1 via the interrupting device 2. Accordingly, functionality required for protecting the power system 1 as a system connecting inverter need only be provided in only the local inverter device 13 of the local system 10A.

The control device C is a device that can control the operation of the local inverter devices 13, the linking inverter devices 20, and the interrupting device 2. For example, the control device C is a device that has an information input/output function, a storage function, a computation processing function, and the like. Note that the functions of the control device C can be realized by one of the control units (not shown) of the local inverter devices 13, the linking inverter devices 20, and the interrupting device 2 functioning as a master control unit, and the other control units functioning as slave control units while performing information communication with the master control unit. Alternatively, the functions of the control device C can be realized by a master control unit that is provided separately from the control units (not shown) of the local inverter devices 13, the linking inverter devices 20, and the interrupting device 2, and is configured so as to be capable of performing information communication with these control units.

Each of the local systems 10 has an AC line 11 to which multiple power consumers D are connected, a power storage device 12, and a local inverter device 13 that connects the power storage device 12 and the AC line 11. Each of the power consumers D has a power consumption device 14 that consumes power supplied from the AC line 11. Alternatively, the power consumer D may have a power generation device 15 in addition to the power consumption device 14. Various devices can be used as the power generation device 15, such as a solar power generator or a wind power generator, which generate power using natural energy such as sunlight or wind, or a fuel cell that generates power using fuel. Note that as shown in FIG. 1, instead of the power generation device 15 being included in the power consumer D, the power generation device 15 may be connected to the AC line 11 on its own. Also, the number of power consumption devices 14 and power generation devices 15 and the combination thereof included in the power consumers D are not limited to the illustrated example. Various devices can be used as the power storage device 12, such as a storage battery (e.g., a chemical cell) or an electrical double layer capacitor.

The local inverter device 13 is constituted by, for example, a circuit unit (not shown) that has a semiconductor switch and the like, and a control unit (not shown) that controls the switching operation of the semiconductor switch. The operation of the local inverter device 13 differs between the connected state in which the AC line 11 is connected to the power system 1 and the parallel-off state in which the AC line 11 is paralleled-off from the power system 1. Specifically, when the AC line 11 and the power system 1 are in the parallel-off state (i.e., when the interrupting device 2 is performing a parallel-off operation), the control device C instructs each of the local inverter devices 13 of the local systems 10 to operate in a parallel-off operation mode in which control is performed such that the voltage of the power on the AC line 11 is at a target voltage, and such that the frequency of the power on the AC line 11 is at a target frequency determined according to the state of charge of the power storage device 12. For example, in the present embodiment, the control device C instructs each of the local inverter devices 13 to operate in the parallel-off operation mode in which control is performed such that the frequency of the power on the AC line 11 is at a target frequency determined according to a relationship in which the frequency rises as the state of charge of the power storage device 12 increases. In contrast, when the AC line 11 and the power system 1 are in the connected state (i.e., the interrupting device 2 is performing a connecting operation), the control device C instructs a local inverter device 13 to operate in a charging operation mode used in charging the power storage device 12 with supplementary power received from the power system 1. In the local inverter device 13 that received this instruction from the control device C, the control unit causes operations to be performed in the charging operation mode by controlling the operation of the circuit unit. Details of the parallel-off operation mode and the charging operation mode will be described later.

The control unit of the local inverter device 13 stores a relational expression according to which the target frequency of the AC line 11 increases as the state of charge of the power storage device 12 increases in an internal memory or the like in advance, and performs control in accordance with this relational expression when operating in the parallel-off operation mode. In this way, the state of charge of the power storage device 12 connected to the AC line 11 via the local inverter device 13 is reflected in the actual frequency (i.e., target frequency) of the AC line 11.

The power supply system S1 includes linking inverter devices 20 between the local systems 10. Specifically, one linking inverter device 20 connects the power storage device 12 of the one local system 10A and the AC line 11 of the other local system 10B, such that the local systems 10 are electrically connected in series. The operation of the linking inverter devices 20 is controlled by the control device C. Specifically, the control device C performs power interchange control in which, with respect to two local systems 10 that are electrically connected via one linking inverter device 20, the operation of the linking inverter device 20 is controlled such that electric power is transmitted from the local system 10 in which the state of charge of the power storage device 12 is relatively higher to the local system 10 in which the state of charge of the power storage device 12 is relatively lower, based on the target frequencies determined according to the states of charge of the power storage devices 12. For example, in the present embodiment, the local inverter devices 13 are each controlled such that the frequency of the power on the AC line 11 is at a target frequency determined according to a relationship in which the frequency rises as the state of charge of the power storage device 12 increases, and therefore the linking inverter device 20 operates such that electric power is supplied from the local system 10 having the higher target frequency (i.e., the state of charge is relatively higher) to the local system 10 having the lower target frequency (the state of charge is relatively lower).

Figure 2:
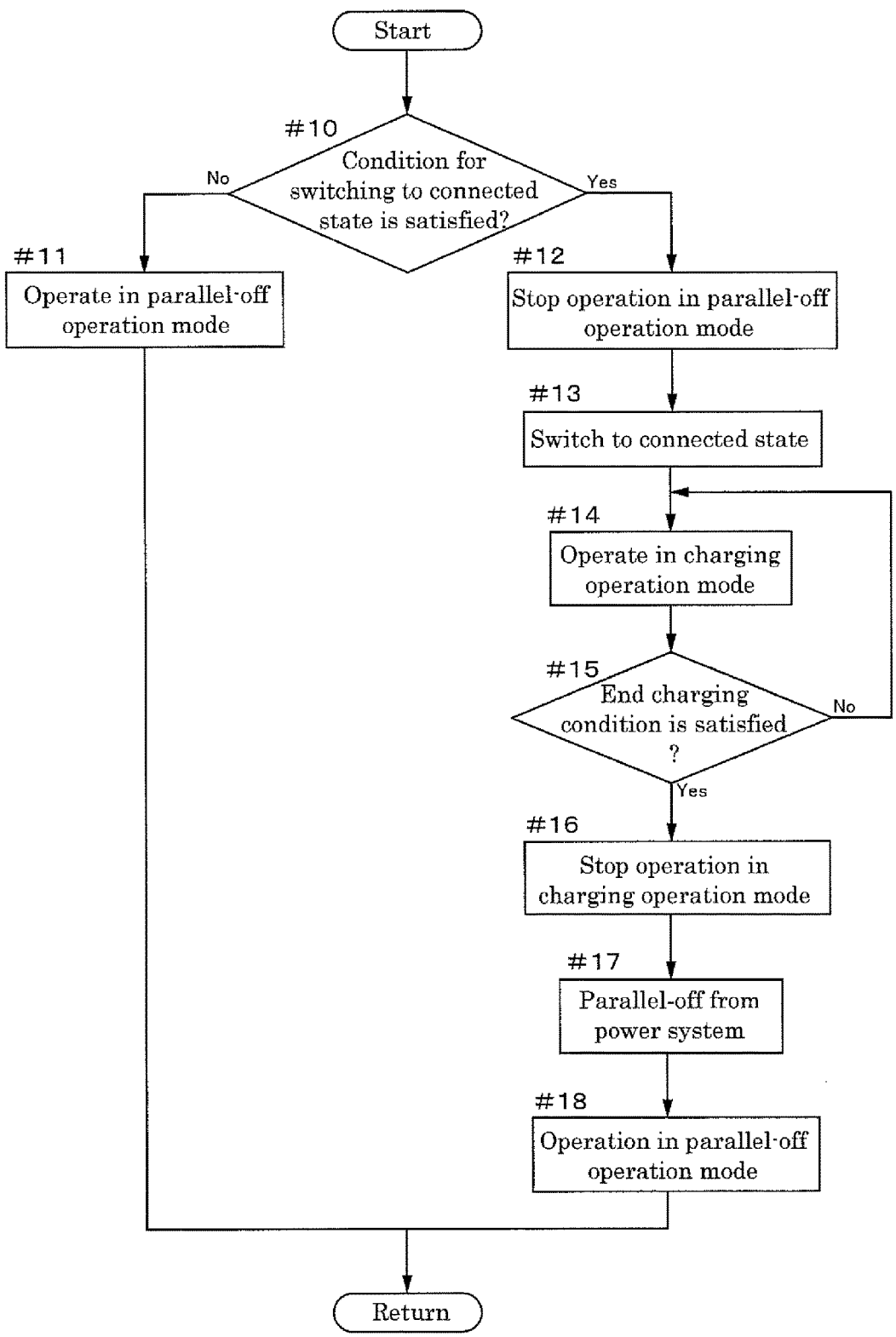
FIG. 2 is a flowchart illustrating an example of control of the power supply system performed by a control device.

Next, control of the operation of the power supply system S1 performed by the control device C will be described. FIG. 2 is a flowchart illustrating an example of control of the power supply system S1 performed by the control device C. As shown in FIG. 2, the control device C causes the local inverter devices 13 to switch between and operate in the parallel-off operation mode and the charging operation mode.

First, before moving to step #10, the control device C causes the local inverter devices 13 to operate in the parallel-off operation mode. In other words, the local inverter devices 13 perform control such that the voltage of the power on the AC line 11 of the local system 10 is at a target voltage, and such that the frequency of the power on the AC line 11 is at a target frequency determined according to a relationship in which the frequency rises as the state of charge of the power storage device 12 increases. As one example of an expression for this relationship, the target frequency is a value obtained by adding the frequency variation component determined by a function of the state of charge of the power storage device 12 (e.g., a relationship in which the frequency variation component increases as the state of charge increases) to the reference frequency of the AC line 11 (e.g., 60 Hz). Also, for example, the linking inverter device 20 detects and compares the frequency of the power on the AC line 11 of the local system 10A (indicated by "fA1" in FIG. 1) and the frequency of the power on the AC line 11 of the local system 10B (indicated by "fB" in FIG. 1), and supplies electric power from the local system 10 having the higher frequency to the local system 10 having the lower frequency. At this time, the actual frequencies fA1 and fB of the power on the AC lines 11 of the local systems 10A and 10B are the same as the target frequencies determined by the local systems 10A and 10B. Accordingly, the linking inverter device 20 may actually detect the frequencies of the power on the AC lines 11 of the local systems 10A and 10B, or may acquire information regarding the target frequencies from the local inverter devices 13 of the local systems 10A and 10B.

In this way, when the control device C causes the local inverter devices 13 to operate in the parallel-off operation mode, the voltage and the frequency of the power on the AC lines 11 of the local systems 10A and 10B are maintained by the electric power supplied from the power storage devices 12. Additionally, even if the state of charge of the power storage device 12 of one local system 10 decreases, the linking inverter device 20A detects the decrease in the state of charge according to the decrease in the frequency of the power on the AC line 11, and performs power interchange control in which electric power is supplied from the other local system 10, thus making it possible to equalize the states of charge of the power storage devices 12 in the local systems 10.

In step #10, the control device C determines whether or not a condition for switching to the connected state has been satisfied. One example of the condition for switching to the connected state is whether or not the state of charge of the power storage device 12 of the local system 10A that can be connected to the power system 1 via the interrupting device 2 is less than a predetermined lower limit state of charge. In other words, the control device C detects the state of charge of the power storage device 12 of the local system 10A, and if that state of charge is less than the lower limit state of charge, the control device C determines that the condition for switching to the connected state has been satisfied. By setting this switching condition in advance, when the state of charge of the power storage device 12 of the local system 10A has decreased, the power storage device 12 can be reliably charged by connecting the power system 1 and the local system 10A as will be described later. In other words, it is possible to restore the state of charge of the power storage device 12 to a high level at an appropriate timing, and increase the amount of reserve power that can be supplied to the power consumers D.

In the case of determining in step #10 that the condition for switching to the connected state has been satisfied, the control device C moves to step #12, and in the case of determining that the condition for switching to the connected state has not been satisfied, the control device C moves to step #11 and continues to cause the local inverter devices 13 of the local systems 10 to operate in the parallel-off operation mode.

If the control device C has determined in step #10 that the condition for switching to the connected state has been satisfied, in step #12, the control device C causes the local inverter device 13 of the local system 10A to stop operating in the parallel-off operation mode. In other words, in the local system 10A, the output of electric power from the local inverter device 13 to the AC line 11 is stopped. At this time, the control device C may temporarily stop the power interchange control performed by the linking inverter device 20, or may not stop the power interchange control performed by the linking inverter device 20.

Next, in step #13, the control device C causes the interrupting device 2 to operate so as to connect the power system 1 and the AC line 11 of the local system 10A. As a result, the voltage and the frequency of the power on the AC line 11 of the local system 10A become the same as the voltage and the frequency of the power system 1.

Thereafter, in step #14, the control device C causes the local inverter device 13 of the local system 10A to operate in the charging operation mode used in charging the power storage device 12 with supplementary power received from the power system 1. In this charging operation mode, the supplementary power: P1 that the local inverter device 13 receives from the power system 1 need only be within the rated capacity of the local inverter device 13. For example, when the local inverter device 13 operates in the charging operation mode under instruction of the control device C, the supplementary power: P1 stored in advance as the power corresponding to 50% of the rated capacity of the local inverter device 13 is supplied from the AC line 11 connected to the power system 1 to the power storage device 12. Note that this value of 50% is merely a value given as an illustrative example, and the present invention is not limited to this value. For example, a variation is possible in which the local inverter device 13 sets the power corresponding to 30% of the rated capacity of the local inverter device 13 as the supplementary power: P1 to be received from the power system 1.

Furthermore, in parallel with causing the local inverter devices 13 to operate in the charging operation mode, the control device C causes the linking inverter device 20 to perform power interchange control. In other words, the electric power that the local inverter device 13 of the local system 10A received from the power system 1 can be transmitted to the local system 10B. Note that in the connected state in which the AC line 11 of the local system 10A is connected to the power system 1, the frequency of the power on the AC line 11 is the frequency of the power in the power system 1, and is not a value that reflects the state of charge of the power storage device 12. It should be noted that while the local inverter device 13 of the local system 10A is operating in the charging operation mode as well, the state of charge of the power storage device 12 is detected, and the target frequency is calculated according to that state of charge. For this reason, for example, the linking inverter device 20A receives a notification of the target frequency from the local inverter device 13 of the local system 10A (indicated by "fA2" in FIG. 1), and thus can detect and compare the target frequency of the power on the AC line 11 of the local system 10A (fA2) and the target frequency of the power on the AC line 11 of the local system 10B (fB). The linking inverter device 20 then performs power interchange control for supplying electric power from the local system 10 having the higher frequency to the local system 10 having the lower frequency.

In step #14, the control device C causes the local inverter devices 13 to operate in the charging operation mode and causes the linking inverter devices 20 to perform power interchange control, and in step #15, the control device C determines whether or not a condition for ending charging has been satisfied. One example of the condition for ending charging is whether or not the state of charge of the power storage device 12 of the local system 10A has reached the fully charged level. The control device C moves to step #16 if it has determined that the condition for ending charging has been satisfied, and returns to step #14 if it has determined that the condition for ending charging has not been satisfied.

Then, if it has been determined in step #15 that the condition for ending charging has been satisfied (e.g., it has been determined that the state of charge of the power storage device 12 of the local system 10A has reached the fully charged level), the control device C moves to step #16 and stops the operation of the local inverter device 13 in the charging operation mode. The control device C also stops the power interchange control being performed by the linking inverter device 20.

If the control device C causes the linking inverter devices 20 to perform power interchange control in parallel with causing the local inverter device 13 of the local system 10A to operate in the charging operation mode used in charging the power storage device 12 with the supplementary power: P1 received from the power system 1 in step #14, the supplementary power supplied from the power system 1 not only charges the power storage device 12 of the local system 10A, but also is transmitted to the local system 10B as well (i.e., is supplied to the power storage device 12 of the local system 10B as well). In other words, the states of charge of the power storage devices 12 in the local systems 10 are equalized by causing the linking inverter device 20 to perform power interchange control, and therefore when the state of charge of the power storage device 12 of the local system 10A arrives at the fully charged level, it may be considered that the states of charge of the power storage devices 12 of all of the local systems 10 have reached the fully charged level. Accordingly, by using the arrival of the state of charge of the power storage device 12 of the local system 10A at the fully charged level as the condition for ending charging, the control device C can detect the state in which the states of charge of the power storage devices 12 of all of the local systems 10 have reached the fully charged level, that is to say, the state in which supplementary power no longer needs to be received from the power system 1.

Next, in step #17, the control device C causes the interrupting device 2 to operate so as to parallel-off the AC line 11 of the local system 10A from the power system 1. Thereafter, in step #18, the control device C causes the local inverter device 13 of the local system 10A to operate in the parallel-off operation mode, and causes the linking inverter devices 20 to perform power interchange control in parallel.

As described above, when the condition for switching to the connected state is satisfied, the AC line 11 of one local system 10 and the power system 1 are connected to each other, and the local inverter device 13 is caused to operate in the charging operation mode, thus making it possible to receive a necessary amount of supplementary power from the power system 1 and charge the power storage device 12. Also, since the local systems 10 are electrically connected by the linking inverter devices 20 provided between the local systems 10, the supplementary power received from the power system 1 by one local system 10 can be supplied to the other local systems 10. Accordingly, the amount of reserve power that can be supplied to the power consumers D can be increased in the power supply system S1 that includes multiple local systems 10.

Second Embodiment

The power supply system S2(S) of the second embodiment is different from the power supply system S1 of the first embodiment in terms of the topology of the connection with the power system 1. In the following description of the power supply system S2 of the second embodiment, descriptions will not be given for configurations that similar to those in the first embodiment.

Figure 3:
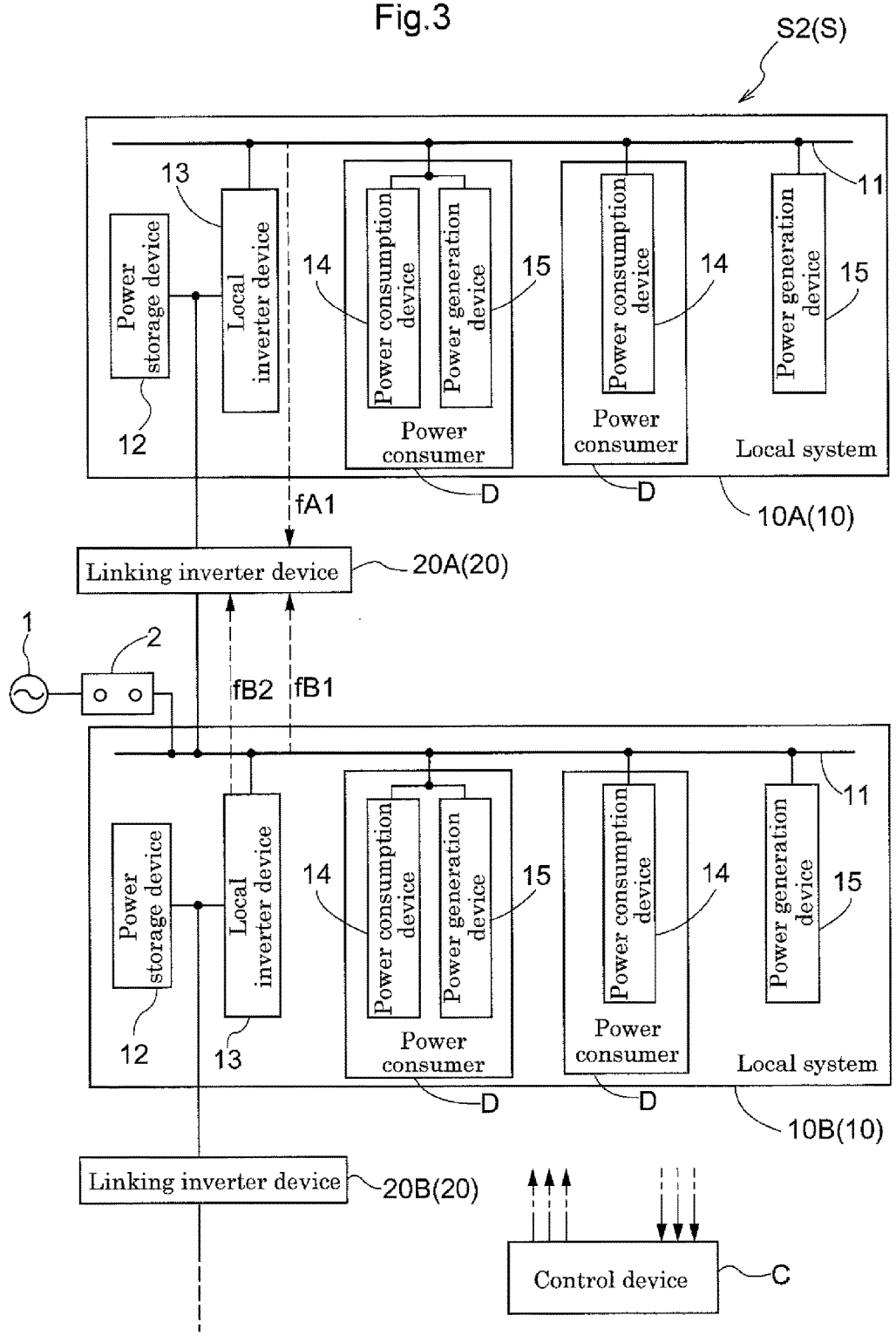
FIG. 3 is a diagram illustrating a configuration of a power supply system according to a second embodiment.

FIG. 3 is a diagram illustrating the configuration of the power supply system S2 according to the second embodiment. In the second embodiment, the AC line 11 of the local system 10B is configured so as to be able to be connected to the power system 1 via the interrupting device 2. Specifically, the AC line 11 connected to both the linking inverter device 20A and the local inverter device 13 of the local system 10B is connected to the power system 1 via the interrupting device 2, and therefore functionality required for protecting the power system 1 as a system connecting inverter needs to be provided in both the linking inverter device 20A and the local inverter device 13 of the local system 10B.

In the power supply system S2 of the second embodiment as well, similarly to the first embodiment, when the AC line 11 of the local system 10B is paralleled-off from the power system 1 (i.e., when the interrupting device 2 is performing an interruption operation), the control device C causes the local inverter devices 13 of the local systems 10 to operate in the parallel-off operation mode, and causes the linking inverter devices 20 to perform power interchange control. In other words, the control device C instructs the local inverter devices 13 of the local systems 10 to operate in the parallel-off operation mode in which control is performed such that the voltage of the power on the AC line 11 of the local system 10 is at a target voltage, and such that the frequency of the power on the AC line 11 is at a target frequency determined according to the state of charge of the power storage device 12. For example, the control device C instructs each of the local inverter devices 13 to operate in the parallel-off operation mode in which control is performed such that the frequency of the power on the AC line 11 is at a target frequency determined according to a relationship in which the frequency rises as the state of charge of the power storage device 12 increases. As a result, the state of charge of the power storage device 12 connected to the AC line 11 via the local inverter device 13 is reflected in the frequency of the power on the AC line 11.

The linking inverter devices 20 each perform power interchange control for supplying electric power from the local system 10 having the higher target frequency to the local system 10 having the lower target frequency. At this time, if the AC line 11 of the local system 10B is paralleled-off from the power system 1, the frequencies of the power on the AC lines 11 of the local systems 10 are the same as the target frequencies of the local systems 10, and therefore the linking inverter devices 20 need only detect and compare the frequencies of the power on the AC lines 11 of the local systems 10.

In contrast, when the AC line 11 of the local system 10B is connected to the power system 1 (i.e., when the interrupting device 2 is performing a connecting operation), the control device C causes the local inverter device 13 of the local system 10B to operate in the charging operation mode, and causes the linking inverter devices 20 to perform power interchange control similarly to the first embodiment. For example, when the local inverter device 13 of the local system 10B is operating in the charging operation mode under instruction of the control device C, the supplementary power: P1 stored in advance as the power corresponding to 50% of the rated capacity of the local inverter device 13 is supplied from the AC line 11 connected to the power system 1 to the power storage device 12.

The linking inverter devices 20 each perform power interchange control for supplying electric power from the local system 10 having the higher target frequency to the local system 10 having the lower target frequency. For example, the linking inverter device 20A receives a notification of the target frequency from the local inverter device 13 of the local system 10A (fA1), and receives a notification of the target frequency from the local inverter device 13 of the local system 10B (indicated by "fB2" in FIG. 3), and thus can compare the target frequency of the power on the AC line 11 of the local system 10A (fA1) and the target frequency of the power on the AC line 11 of the local system 10B (fB2). The linking inverter device 20A then performs power interchange control for supplying electric power from the local system 10 having the higher frequency to the local system 10 having the lower frequency.

Third Embodiment

Figure 4:
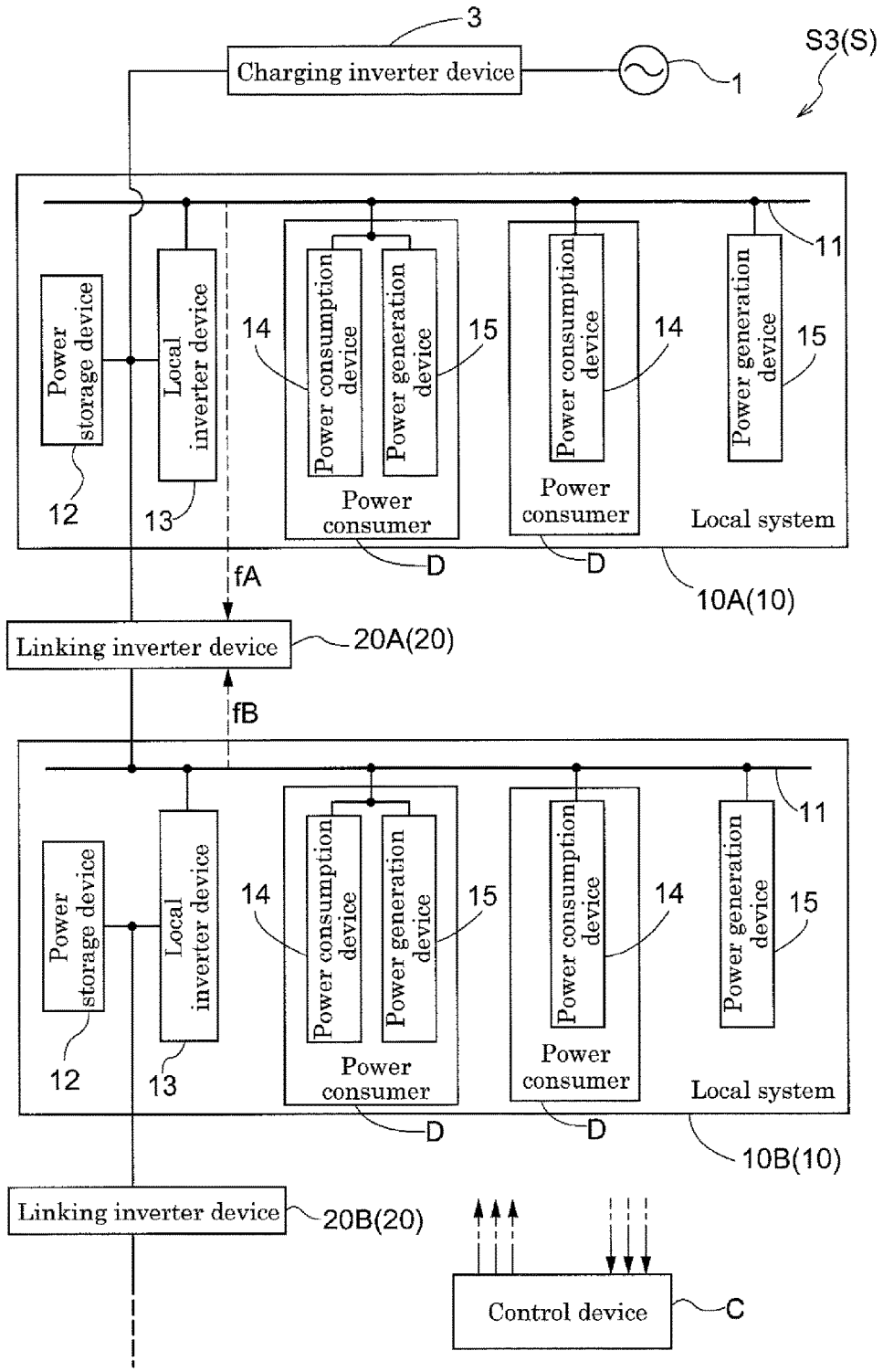
FIG. 4 is a diagram illustrating a configuration of a power supply system according to a third embodiment.

The following describes the power supply system S3(S) of the third embodiment with reference to the drawings. FIG. 4 is a diagram illustrating the configuration of the power supply system S3 according to the third embodiment. As shown in FIG. 4, the power supply system S3 includes multiple local systems 10, the linking inverter devices 20 provided between the local systems 10, a charging inverter device 3, and the control device C. Although FIG. 4 shows an example in which the power supply system S3 includes local systems 10A and 10B and linking inverter devices 20A and 20B, it is possible to construct a system that includes an even greater number of local systems 10 and linking inverter devices 20. The charging inverter device 3 is a device that connects the power storage device 12 of one local system 10 out of the local systems 10 and the external power system 1, and can be used to charge the power storage device 12 with supplementary power received from the power system 1. In the present embodiment, the charging inverter device 3 is provided so as to connect the AC line 11 of the local system 10A and the external power system 1, and can convert AC power received from the power system 1 into desired DC power and supply it to the power storage device 12 side. In this way, the charging inverter device 3 is a device for connecting the power system 1 and a local system 10, and thus needs to be provided with functionality required for protecting the power system 1 as a system connecting inverter.

The control device C is a device that can control the operation of the local inverter devices 13, the linking inverter devices 20, and the charging inverter device 3. For example, the control device C is a device that has an information input/output function, a storage function, a computation processing function, and the like. Note that the functions of the control device C can be realized by one of the control units (not shown) of the local inverter devices 13, the linking inverter devices 20, and the charging inverter device 3 functioning as a master control unit, and the other control units functioning as slave control units while performing information communication with the master control unit. Alternatively, the functions of the control device C can be realized by a master control unit that is provided separately from the control units (not shown) of the local inverter devices 13, the linking inverter devices 20, and the charging inverter device 3, and is configured so as to be capable of performing information communication with these control units.

Each of the local systems 10 has an AC line 11 to which multiple power consumers D are connected, a power storage device 12, and a local inverter device 13 that connects the power storage device 12 and the AC line 11. Each of the power consumers D has a power consumption device 14 that consumes power supplied from the AC line 11. Alternatively, the power consumer D may have a power generation device 15 in addition to the power consumption device 14. Various devices can be used as the power generation device 15, such as a solar power generator or a wind power generator, which generate power using natural energy such as sunlight or wind, or a fuel cell that generates power using fuel. Note that as shown in FIG. 4, instead of the power generation device 15 being included in the power consumer D, the power generation device 15 may be connected to the AC line 11 on its own. Also, the number of power consumption devices 14 and power generation devices 15 and the combination thereof included in the power consumers D are not limited to the illustrated example. Various devices can be used as the power storage device 12, such as a storage battery (e.g., a chemical cell) or an electrical double layer capacitor.

The local inverter device 13 is constituted by, for example, a circuit unit (not shown) that has a semiconductor switch and the like, and a control unit (not shown) that controls the switching operation of the semiconductor switch. The control device C instructs each of the local inverter devices 13 of the local systems 10 to perform control such that the voltage of the power on the AC line 11 is at a target voltage, and such that the frequency of the power on the AC line 11 is at a target frequency determined according to the state of charge of the power storage device 12. For example, in the present embodiment, the control device C instructs each of the local inverter devices 13 to perform control such that the frequency of the power on the AC line 11 is at a target frequency determined according to a relationship in which the frequency rises as the state of charge of the power storage device 12 increases. As one example of an expression for this relationship, the target frequency is a value obtained by adding the frequency variation component determined by a function of the state of charge of the power storage device 12 (e.g., a relationship in which the frequency variation component increases as the state of charge increases) to the reference frequency of the AC line 11 (e.g., 60 Hz).

The control unit of the local inverter device 13 stores a relational expression according to which the target frequency of the AC line 11 increases as the state of charge of the power storage device 12 increases in an internal memory or the like in advance, and performs voltage control and frequency control with respect to the AC line 11 in accordance with this relational expression. In this way, the state of charge of the power storage device 12 connected to the AC line 11 via the local inverter device 13 is reflected in the actual frequency (i.e., target frequency) of the AC line 11.

The power supply system S3 includes linking inverter devices 20 between the local systems 10. Specifically, one linking inverter device 20 connects the power storage device 12 of the one local system 10A and the AC line 11 of the other local system 10B, such that the local systems 10 are electrically connected in series. The operation of the linking inverter devices 20 is controlled by the control device C. Specifically, the control device C performs power interchange control in which, with respect to two local systems 10 that are electrically connected via one linking inverter device 20, the operation of the linking inverter device 20 is controlled such that electric power is transmitted from the local system 10 in which the state of charge of the power storage device 12 is relatively higher to the local system 10 in which the state of charge of the power storage device 12 is relatively lower, based on the target frequencies determined according to the states of charge of the power storage devices 12. For example, in the present embodiment, the local inverter devices 13 are each controlled such that the frequency of the power on the AC line 11 is at a target frequency determined according to a relationship in which the frequency rises as the state of charge of the power storage device 12 increases, and therefore the linking inverter device 20 operates such that electric power is supplied from the local system 10 having the higher target frequency (i.e., the state of charge is relatively higher) to the local system 10 having the lower target frequency (the state of charge is relatively lower).

Figure 5:
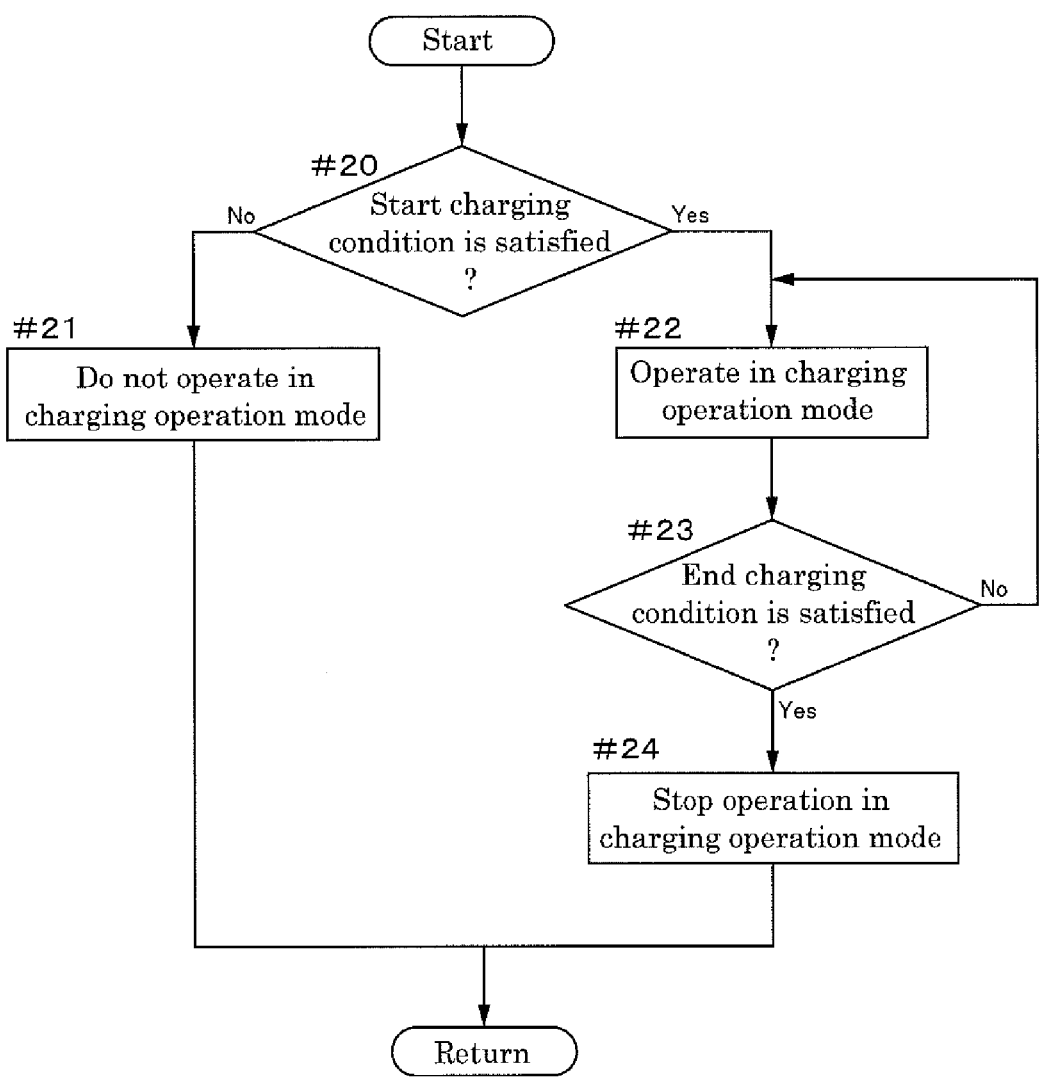
FIG. 5 is a flowchart illustrating an example of control of the power supply system performed by the control device.

Next, control of the operation of the power supply system S3 performed by the control device C will be described. FIG. 5 is a flowchart illustrating an example of control of the power supply system S3 performed by the control device C. As shown in FIG. 5, the control device C causes the charging inverter device 3 to operate in or stop operating in the charging operation mode.

First, before moving to step #20, the control device C does not cause the charging inverter device 3 to operate in the charging operation mode. In other words, the power storage device 12 of the local system 10A is not being charged using the charging inverter device 3. At this time, the local inverter device 13 performs control such that the voltage of the power on the AC line 11 of the local system 10 is at a target voltage, and such that the frequency of the power on the AC line 11 is at a target frequency determined according to a relationship in which the frequency rises as the state of charge of the power storage device 12 increases. Also, for example, the linking inverter device 20 detects and compares the frequency of the power on the AC line 11 of the local system 10A (indicated by "fA" in FIG. 4) and the frequency of the power on the AC line 11 of the local system 10B (indicated by "fB" in FIG. 4), and supplies electric power from the local system 10 having the higher frequency to the local system 10 having the lower frequency. At this time, the actual frequencies fA and fB of the power on the AC lines 11 of the local systems 10A and 10B are the same as the target frequencies determined by the local systems 10A and 10B. Accordingly, the linking inverter device 20 may actually detect the frequencies of the power on the AC lines 11 of the local systems 10A and 10B, or may acquire information regarding the target frequencies from the local inverter devices 13 of the local systems 10A and 10B.

In this way, the voltage and the frequency of the power on the AC lines 11 of the local systems 10A and 10B are maintained by the electric power supplied from the power storage devices 12. Additionally, even if the state of charge of the power storage device 12 of one local system 10 decreases, the linking inverter device 20A detects the decrease in the state of charge according to the decrease in the frequency of the power on the AC line 11, and performs power interchange control in which electric power is supplied from the other local system 10, thus making it possible to equalize the states of charge of the power storage devices 12 in the local systems 10.

In step #20, the control device C determines whether or not a condition for starting charging has been satisfied. One example of the condition for starting charging is whether or not the state of charge of the power storage device 12 of the local system 10 connected to the power system 1 via the charging inverter device 3 is less than a predetermined lower limit state of charge. In other words, the control device C detects the state of charge of the power storage device 12 of the local system 10A, and if that state of charge is less than the lower limit state of charge, the control device C determines that the condition for starting charging has been satisfied. By setting this condition for starting charging in advance, when the state of charge of the power storage device 12 of the local system 10A has decreased, the power storage device 12 can be reliably charged by supplementary power received from the power system 1 via the charging inverter device 3 as will be described later. In other words, it is possible to restore the state of charge of the power storage device 12 to a high level at an appropriate timing, and increase the amount of reserve power that can be supplied to the power consumers D.

In the case of determining in step #20 that the condition for starting charging has been satisfied, the control device C moves to step #22, and in the case of determining that the condition for starting charging has not been satisfied, the control device C moves to step #21 and does not cause the charging inverter device 3 to operate in the charging operation mode.

If the control device C has determined in step #20 that the condition for starting charging has been satisfied, in step #22, the control device C instructs the charging inverter device 3 to operate in the charging operation mode. Also, in the present embodiment, even while the charging inverter device 3 is caused to operate in the charging operation mode, the control device C causes the local inverter device 13 to perform voltage control and frequency control on the AC line 11 as previously described, and causes the linking inverter device 20 to perform power interchange control as previously described.

The supplementary power: P1 that the charging inverter device 3 receives from the power system 1 due to the operation of the charging inverter device 3 in the charging operation mode need only be within the rated capacity of the charging inverter device 3. For example, when the charging inverter device 3 is operating in the charging operation mode under instruction of the control device C, the supplementary power: P1 stored in advance as the power corresponding to 50% of the rated capacity of the charging inverter device 3 is received from the power system 1 and supplied to the power storage device 12. Note that this value of 50% is merely a value given as an illustrative example, and the present invention is not limited to this value. For example, a variation is possible in which the charging inverter device 3 sets the power corresponding to 30% of the rated capacity of the charging inverter device 3 as the supplementary power: P1 to be received from the power system 1.

In the present embodiment, as described above, in parallel with causing the charging inverter device 3 to operate in the charging operation mode, the control device C causes the local inverter device 13 to perform voltage control and frequency control on the AC line 11 as described above. As a result, the rise in the state of charge of the power storage device 12 due to charging using supplementary power received from the power system 1 is accompanied by a rise in the frequency of the power on the AC line 11 of the local system 10A. Furthermore, the control device C causes the linking inverter device 20 to perform power interchange control. In other words, the rise in the state of charge of the power storage device 12 due to charging using supplementary power received from the power system 1 is accompanied by a rise in the frequency of the power on the AC line 11 of the local system 10A, and thus the linking inverter device 20A supplies electric power from the local system 10A to the local system 10B.

In step #23, the control device C determines whether or not a condition for ending charging has been satisfied. One example of the condition for ending charging is whether or not the state of charge of the power storage device 12 of the local system 10A has reached the fully charged level. The control device C moves to step #24 if it has determined that the condition for ending charging has been satisfied, and returns to step #22 if it has determined that the condition for ending charging has not been satisfied.

Then, if it has been determined in step #23 that the condition for ending charging has been satisfied (e.g., it has been determined that the state of charge of the power storage device 12 of the local system 10A has reached the fully charged level), the control device C moves to step #24 and stops the operation of the charging inverter device 3 in the charging operation mode. As a result, the local system 10A is cut off from the power system 1.

As described above, if the control device C causes the local inverter devices 13 to perform voltage control and frequency control on the AC line 11 as described above and causes the linking inverter devices 20 to perform power interchange control in parallel with causing the charging inverter device 3 to operate in the charging operation mode in step #22, the supplementary power supplied from the power system 1 not only charges the power storage device 12 of the local system 10A, but also is transmitted to the local system 10B as well (i.e., is supplied to the power storage device 12 of the local system 10B as well). In other words, the states of charge of the power storage devices 12 in the local systems 10 are equalized by causing the linking inverter device 20 to perform power interchange control, and therefore when the state of charge of the power storage device 12 of the local system 10A arrives at the fully charged level, it may be considered that the states of charge of the power storage devices 12 of all of the local systems 10 have reached the fully charged level. Accordingly, by using the arrival of the state of charge of the power storage device 12 of the local system 10A at the fully charged level as the condition for ending charging, the control device C can detect the state in which the states of charge of the power storage devices 12 of all of the local systems 10 have reached the fully charged level, that is to say, the state in which supplementary power no longer needs to be received from the power system 1.

As described above, when the condition for starting charging is satisfied, the charging inverter device 3 is caused to operate in the charging operation mode, thus making it possible to receive a necessary amount of supplementary power from the power system 1 and charge the power storage device 12. Also, since the local systems 10 are electrically connected by the linking inverter devices 20 provided between the local systems 10, the supplementary power received from the power system 1 by one local system 10 can be supplied to the other local systems 10. Accordingly, the amount of reserve power that can be supplied to the power consumers D can be increased in the power supply system S3 that includes multiple local systems 10.

Fourth Embodiment

The following describes the power supply system S4(S) of the fourth embodiment with reference to the drawings. FIG. 6 is a diagram illustrating the configuration of the power supply system S4 according to the fourth embodiment. As shown in FIG. 6, the power supply system S4 includes multiple local systems 10, the linking inverter devices 20 provided between the local systems 10, a power conversion device 4, and the control device C. Although FIG. 6 shows an example in which the power supply system S4 includes local systems 10A and 10B and linking inverter devices 20A and 20B, it is possible to construct a system that includes an even greater number of local systems 10 and linking inverter devices 20. The power conversion device 4 is a device that connects the AC line 11 of the local system 10A, which is one of the local systems 10, and the external power system 1. In the present embodiment, the power conversion device 4 has an AC/DC conversion unit 4a that converts AC power supplied from the power system 1 into desired DC power, a DC/AC conversion unit 4b that converts the DC power generated by the AC/DC conversion unit 4a into desired AC power and supplies the AC power to the AC line 11, and a DC connection unit 4c that connects the AC/DC conversion unit 4a and the DC/AC conversion unit 4b. In this way, in the power supply system S4 shown in FIG. 6, only the local system 10A can be connected to the power system 1 via the power conversion device 4. In this way, the power conversion device 4 is a device for connecting the power system 1 and an AC line 11, and thus needs to be provided with functionality required for protecting the power system 1 as a system connecting inverter.

The control device C is a device that can control the operation of the local inverter devices 13, the linking inverter devices 20, and the power conversion device 4. For example, the control device C is a device that has an information input/output function, a storage function, a computation processing function, and the like. Note that the functions of the control device C can be realized by one of the control units (not shown) of the local inverter devices 13, the linking inverter devices 20, and the power conversion device 4 functioning as a master control unit, and the other control units functioning as slave control units while performing information communication with the master control unit. Alternatively, the functions of the control device C can be realized by a master control unit that is provided separately from the control units (not shown) of the local inverter devices 13, the linking inverter devices 20, and the power conversion device 4, and is configured so as to be capable of performing information communication with these control units.

Each of the local systems 10 has an AC line 11 to which multiple power consumers D are connected, a power storage device 12, and a local inverter device 13 that connects the power storage device 12 and the AC line 11. Each of the power consumers D has a power consumption device 14 that consumes power supplied from the AC line 11. Alternatively, the power consumer D may have a power generation device 15 in addition to the power consumption device 14. Various devices can be used as the power generation device 15, such as a solar power generator or a wind power generator, which generate power using natural energy such as sunlight or wind, or a fuel cell that generates power using fuel. Note that as shown in FIG. 6, instead of the power generation device 15 being included in the power consumer D, the power generation device 15 may be connected to the AC line 11 on its own. Also, the number of power consumption devices 14 and power generation devices 15 and the combination thereof included in the power consumers D are not limited to the illustrated example. Various devices can be used as the power storage device 12, such as a storage battery (e.g., a chemical cell) or an electrical double layer capacitor.

The local inverter device 13 is constituted by, for example, a circuit unit (not shown) that has a semiconductor switch and the like, and a control unit (not shown) that controls the switching operation of the semiconductor switch. The control device C instructs each of the local inverter devices 13 of the local systems 10 to perform control such that the voltage of the power on the AC line 11 is at a target voltage, and such that the frequency of the power on the AC line 11 is at a target frequency determined according to the state of charge of the power storage device 12. For example, in the present embodiment, the control device C instructs each of the local inverter devices 13 to perform control such that the frequency of the power on the AC line 11 is at a target frequency determined according to a relationship in which the frequency rises as the state of charge of the power storage device 12 increases. As one example of an expression for this relationship, the target frequency is a value obtained by adding the frequency variation component determined by a function of the state of charge of the power storage device 12 (e.g., a relationship in which the frequency variation component increases as the state of charge increases) to the reference frequency of the AC line 11 (e.g., 60 Hz).

The control unit of the local inverter device 13 stores a relational expression according to which the target frequency of the AC line 11 increases as the state of charge of the power storage device 12 increases in an internal memory or the like in advance, and performs control in accordance with this relational expression when operating in the parallel-off operation mode. In this way, the state of charge of the power storage device 12 connected to the AC line 11 via the local inverter device 13 is reflected in the actual frequency (i.e., target frequency) of the AC line 11.

The power supply system S4 includes linking inverter devices 20 between the local systems 10. Specifically, one linking inverter device 20 connects the power storage device 12 of the one local system 10A and the AC line 11 of the other local system 10B, such that the local systems 10 are electrically connected in series. The operation of the linking inverter devices 20 is controlled by the control device C. Specifically, the control device C performs power interchange control in which, with respect to two local systems 10 that are electrically connected via one linking inverter device 20, the operation of the linking inverter device 20 is controlled such that electric power is transmitted from the local system 10 in which the state of charge of the power storage device 12 is relatively higher to the local system 10 in which the state of charge of the power storage device 12 is relatively lower, based on the target frequencies determined according to the states of charge of the power storage devices 12. For example, in the present embodiment, the local inverter devices 13 are each controlled such that the frequency of the power on the AC line 11 is at a target frequency determined according to a relationship in which the frequency rises as the state of charge of the power storage device 12 increases, and therefore the linking inverter device 20 operates such that electric power is supplied from the local system 10 having the higher target frequency (i.e., the state of charge is relatively higher) to the local system 10 having the lower target frequency (the state of charge is relatively lower).

The power conversion device 4 detects the frequency of the AC line 11 (indicated by "fA" in FIG. 6) being controlled to the target frequency by the local inverter device 13, and performs power conversion in which supplementary power is received from the power system 1, the frequency of the supplementary power is adjusted to the target frequency, and the adjusted supplementary power is supplied to the AC line 11. Specifically, the power conversion device 4 of the present embodiment has the AC/DC conversion unit 4a, the DC/AC conversion unit 4b, and the DC connection unit 4c, as described above. Accordingly, in the power conversion device 4, the AC/DC conversion unit 4a can convert the supplementary power supplied from the power system 1 into desired DC power, the DC/AC conversion unit 4b can convert the DC power into AC power having the target frequency, and the resulting AC power can be supplied to the AC line 11. In this way, by receiving supplementary power from the power system 1, adjusting the frequency of the supplementary power to the target frequency, and supplying the adjusted supplementary power to the AC line 11, it is possible to prevent fluctuation of the target frequency being controlled by the local inverter device 13 in accordance with the state of charge of the power storage device 12. As a result, even while a supply of supplementary power is being received from the power system 1, it is possible to ensure that the frequency of the power on the AC line 11 is a value that reflects the state of charge of the power storage device 12.

Next, control of the operation of the power supply system S4 performed by the control device C will be described. FIG. 7 is a flowchart illustrating an example of control of the power supply system S4 performed by the control device C. As shown in FIG. 7, the control device C causes the power conversion device 4 to operate in or stop operating in a supplementation operation mode in which supplementary power is received from the power system 1, the frequency of the supplementary power is adjusted to the target frequency, and the adjusted supplementary power is supplied to the AC line 11.

First, before moving to step #30, the control device C does not cause the power conversion device 4 to operate in the supplementation operation mode. In other words, electric power is not being supplied from the power system 1 to the AC line 11 of the local system 10A via the power conversion device 4. At this time, the local inverter device 13 performs control such that the voltage of the power on the AC line 11 of the local system 10 is at a target voltage, and such that the frequency of the power on the AC line 11 is at a target frequency determined according to a relationship in which the frequency rises as the state of charge of the power storage device 12 increases. Also, for example, the linking inverter device 20 detects and compares the frequency of the power on the AC line 11 of the local system 10A (indicated by "fA" in FIG. 6) and the frequency of the power on the AC line 11 of the local system 10B (indicated by "fB" in FIG. 6), and supplies electric power from the local system 10 having the higher frequency to the local system 10 having the lower frequency. At this time, the actual frequencies fA and fB of the power on the AC lines 11 of the local systems 10A and 10B are the same as the target frequencies determined by the local systems 10A and 10B. Accordingly, the linking inverter device 20 may actually detect the frequencies of the power on the AC lines 11 of the local systems 10A and 10B, or may acquire information regarding the target frequencies from the local inverter devices 13 of the local systems 10A and 10B.

In this way, the voltage and the frequency of the power on the AC lines 11 of the local systems 10A and 10B are maintained by the electric power supplied from the power storage devices 12. Additionally, even if the state of charge of the power storage device 12 of one local system 10 decreases, the linking inverter device 20A detects the decrease in the state of charge according to the decrease in the frequency of the power on the AC line 11, and performs power interchange control in which electric power is supplied from the other local system 10, thus making it possible to equalize the states of charge of the power storage devices 12 in the local systems 10.

In step #30, the control device C determines whether or not a condition for starting supplementation, in which supplementary power received from the power system 1 is to be supplied to the AC line 11 of the local system 10, has been satisfied. One example of the condition for starting supplementation is whether or not the state of charge of the power storage device 12 of the local system 10 connected to the power system 1 via the power conversion device 4 is less than a predetermined lower limit state of charge. In other words, the control device C detects the state of charge of the power storage device 12 of the local system 10A, and if that state of charge is less than the lower limit state of charge, the control device C determines that the condition for starting supplementation has been satisfied. By setting this condition for starting supplementation in advance, when the state of charge of the power storage device 12 of the local system 10A has decreased, the power storage device 12 can be reliably charged by supplementary power received from the power system 1 via the power conversion device 4 as will be described later. In other words, it is possible to restore the state of charge of the power storage device 12 to a high level at an appropriate timing, and increase the amount of reserve power that can be supplied to the power consumers D.

In the case of determining in step #30 that the condition for starting supplementation has been satisfied, the control device C moves to step #32, and in the case of determining that the condition for starting supplementation has not been satisfied, the control device C moves to step #31 and does not cause the power conversion device 4 to operate in the supplementation operation mode.

If the control device C has determined in step #30 that the condition for starting supplementation has been satisfied, in step #32, the control device C instructs the power conversion device 4 to operate in the supplementation operation mode. As a result, the power conversion device 4 detects the frequency of the AC line 11 (indicated by "fA" in FIG. 6), and performs power conversion in which supplementary power is received from the power system 1, the frequency of the supplementary power is adjusted to the frequency of the AC line 11, and the adjusted supplementary power is supplied to the AC line 11. Also, in the present embodiment, even while the power conversion device 4 is caused to operate in the supplementation operation mode, the control device C causes the local inverter device 13 to perform voltage control and frequency control on the AC line 11 as previously described, and causes the linking inverter device 20 to perform power interchange control as previously described.

The supplementary power: P1 that the power conversion device 4 receives from the power system 1 due to the operation of the power conversion device 4 in the supplementation operation mode need only be within the rated capacity of the power conversion device 4. For example, when the power conversion device 4 is operating in the supplementation operation mode under instruction of the control device C, the supplementary power: P1 stored in advance as the power corresponding to 50% of the rated capacity of the power conversion device 4 is received from the power system 1 and supplied to the AC line 11. Note that this value of 50% is merely a value given as an illustrative example, and the present invention is not limited to this value. For example, a variation is possible in which the power conversion device 4 sets the power corresponding to 30% of the rated capacity of the power conversion device 4 as the supplementary power: P1 to be received from the power system 1.

In the present embodiment, as described above, in parallel with causing the power conversion device 4 to operate in the supplementation operation mode, the control device C causes the local inverter device 13 to perform voltage control and frequency control on the AC line 11. As a result, due to the supplementary power supplied from the power system 1 to the AC line 11 via the power conversion device 4, the voltage of the AC line 11 rises to a voltage higher than the target voltage. As a result, in order to lower the voltage of the power on the AC line 11 to the target voltage, the local inverter device 13 supplies electric power from the AC line 11 to the power storage device 12, and the state of charge of the power storage device 12 rises. As a result, due to the operation of the local inverter device 13, the frequency of the power on the AC line 11 of the local system 10A rises. Accordingly, the frequency of the power on the AC line 11 detected by the power conversion device 4 also rises. The control device C then causes the linking inverter device 20 to perform power interchange control. In other words, the rise in the state of charge of the power storage device 12 due to charging using supplementary power received from the power system 1 is accompanied by a rise in the frequency of the power on the AC line 11 of the local system 10A, and thus the linking inverter device 20A supplies electric power from the local system 10A to the local system 10B.

In step #33, the control device C determines whether or not a condition for ending supplementation has been satisfied. One example of the condition for ending supplementation is whether or not the state of charge of the power storage device 12 of the local system 10A has reached the fully charged level. The control device C moves to step #34 if it has determined that the condition for ending supplementation has been satisfied, and returns to step #32 if it has determined that the condition for ending supplementation has not been satisfied.

Then, if it has been determined in step #33 that the condition for ending supplementation has been satisfied (e.g., it has been determined that the state of charge of the power storage device 12 of the local system 10A has reached the fully charged level), the control device C moves to step #34 and stops the operation of the power conversion device 4 in the supplementation operation mode. As a result, the supply of power from the power system 1 to the local system 10A is stopped.

As described above, if the control device C causes the local inverter devices 13 to perform voltage control and frequency control on the AC line 11 as described above and causes the linking inverter devices 20 to perform power interchange control in parallel with causing the power conversion device 4 to operate in the supplementation operation mode in step #32, the supplementary power supplied from the power system 1 not only charges the power storage device 12 of the local system 10A, but also is transmitted to the local system 10B as well (i.e., is supplied to the power storage device 12 of the local system 10B as well). In other words, the states of charge of the power storage devices 12 in the local systems 10 are equalized by causing the linking inverter device 20 to perform power interchange control, and therefore when the state of charge of the power storage device 12 of the local system 10A arrives at the fully charged level, it may be considered that the states of charge of the power storage devices 12 of all of the local systems 10 have reached the fully charged level. Accordingly, by using the arrival of the state of charge of the power storage device 12 of the local system 10A at the fully charged level as the condition for ending supplementation, the control device C can detect the state in which the states of charge of the power storage devices 12 of all of the local systems 10 have reached the fully charged level, that is to say, the state in which supplementary power no longer needs to be received from the power system 1.

As described above, when the condition for starting supplementation, in which supplementary power is supplied to the AC line 11 of one local system 10, is satisfied, the power conversion device 4 is caused to operate in the supplementation operation mode, thus making it possible to receive a necessary amount of supplementary power from the power system 1 and charge the power storage device 12. Also, since the local systems 10 are electrically connected by the linking inverter devices 20 provided between the local systems 10, the supplementary power received from the power system 1 by one local system 10 can be supplied to the other local systems 10. Furthermore, due to the power conversion device 4 receiving supplementary power from the power system 1, adjusting the frequency of the supplementary power to the target frequency, and supplying the adjusted supplementary power to the AC line 11, it is possible to prevent fluctuation of the target frequency being controlled by the local inverter device 13 in accordance with the state of charge of the power storage device 12. As a result, even while a supply of supplementary power is being received from the power system 1, it is possible to ensure that the frequency of the power on the AC line 11 is a value that reflects the state of charge of the power storage device 12.

Other Embodiments (1)

The first and second embodiments describe an example of the case in which the condition for switching to the connected state is that the state of charge of the power storage device 12 of the local system 10A that can be connected to the power system 1 via the interrupting device 2 is less than a predetermined lower limit state of charge, but the content of the switching condition can be changed appropriately. For example, whether or not a set time has been reached may be used as the condition for switching to the connected state. In other words, if the set time is reached, the control device C may determine that the condition for switching to the connected state has been satisfied, and connect the power system 1 and the local system 10A. In this way, by determining that the condition for switching to the connected state has been satisfied when the set time is reached, it is possible to periodically charge the power storage device 12 with supplementary power received from the power system 1 at the set time. For example, if the set time is set before a time period in which power demand rises in a day, it is possible to raise the amount of power that can be supplied to the power consumers D before the time period in which power demand rises.

Furthermore, also regarding the amount of supplementary power: P1 that the local inverter device 13 of the local system 10A that can be connected to the power system 1 via the interrupting device 2 receives from the power system 1, this amount may be set using a method different from the first and second embodiments. For example, in the case of determining that the condition for switching to the connected state has been satisfied if a set time has been reached as in this other embodiment, the state of charge of the power storage device 12 of the local system 10A can be any of various values when the switching condition is satisfied, and therefore the amount of supplementary power: P1 that the local inverter device 13 of the local system 10A is to receive from the power system 1 may be changed according to the state of charge. Specifically, upon determining that the condition for switching to the connected state has been satisfied, the control device C may change the amount of supplementary power: P1 that the local inverter device 13 is to receive from the power system 1 in the charging operation mode in accordance with the magnitude of the state of charge of the power storage device 12 of the local system 10A that can be connected to the power system 1 via the interrupting device 2.

For example, upon determining that the condition for switching to the connected state has been satisfied, the control device C detects the state of charge of the power storage device 12 of the local system 10A that can be connected to the power system 1 via the interrupting device 2. The control device C then causes the local inverter device 13 to operate such that the lower the state of charge of the power storage device 12 is, the greater the amount of supplementary power: P1 that is to be received from the power system 1 is. For example, the control device C can cause the local inverter device 13 to operate in the charging operation mode such that, if the state of charge of the power storage device 12 is greater than or equal to 50% of full charge, the supplementary power: P1 to be received from the power system 1 is set to 30% of the rated capacity of the local inverter device 13, and power supply is received from the power system 1, and such that, if the state of charge of the power storage device 12 is less than 50% of full charge, the supplementary power: P1 to be received from the power system 1 is set to 50% of the rated capacity of the local inverter device 13, and power supply is received from the power system 1.

Alternatively, in the case where a natural energy power generation device whose power generation changes according to the weather is included in a local system 10 as the power generation device 15, the control device C may change the condition for switching to the connected state according to weather information predicted for the future (e.g., the next day). The first and second embodiments describe an example of the case in which the condition for switching to the connected state is that the state of charge of the power storage device 12 is less than a predetermined lower limit state of charge, but the condition for switching to the connected state can be substantially changed by changing the magnitude of the lower limit state of charge, for example. Examples of a natural energy power generation device include a solar power generator whose power generation changes according to weather conditions such as "sunny", "cloudy", and "rainy", and a wind power generator whose power generation changes according to weather conditions such as wind speed and the duration for which the wind is blowing.

Specifically, if a solar power generator is connected as the power generation device 15 to the AC line 11 of at least one local system 10 among the multiple local systems 10, the control device C acquires weather information predicted for the future via a communication network (not shown) or the like, and changes the condition for switching to the connected state by changing the magnitude of the lower limit state of charge according to the weather information. To give one example, if the weather condition predicted for the next day is sunny (i.e., if a large rise in the state of charge of the power storage device 12 can be expected), the control device C sets the lower limit state of charge to 50% of the full charge of the power storage device 12, and determines that the condition for switching to the connected state has been satisfied if the state of charge of the power storage device 12 of the local system 10 falls to less than 50% of full charge. Furthermore, if the weather condition predicted for the next day is cloudy (i.e., if a slight rise in the state of charge of the power storage device 12 can be expected), the control device C sets the lower limit state of charge to 60% of the full charge of the power storage device 12, and determines that the condition for switching to the connected state has been satisfied if the state of charge of the power storage device 12 of the local system 10 falls to less than 60% of full charge. Also, a variation is possible in which if the weather condition predicted for the next day is rainy (i.e., if almost no rise in the state of charge of the power storage device 12 can be expected), the control device C sets the lower limit state of charge to 80% of the full charge of the power storage device 12, and determines that the condition for switching to the connected state has been satisfied if the state of charge of the power storage device 12 of the local system 10 falls to less than 80% of full charge.

Alternatively, a variation is possible in which the control device C determines that the condition for switching to the connected state has been satisfied if the total of the actual states of charge of the power storage devices 12 of the local systems 10 that constitute the power supply system S is less than a predetermined percentage (e.g., less than 50%) of the total state of charge when all of the power storage devices 12 are fully charged.

Alternatively, a variation is possible in which the control device C determines that the condition for switching to the connected state has been satisfied if the electric power unit price of purchased electric power when receiving a supply of electric power from the power system 1 is less than a set unit price.

Furthermore, the control device C may employ a combination of the switching conditions described above. For example, the satisfaction of either the condition that the state of charge of the power storage device 12 of the local system 10 that can be connected to the power system 1 via the interrupting device 2 is less than the lower limit state of charge or the condition that the set time has been reached may be used by the control device C as the condition for switching to the connected state. In this case, even if the state of charge of the power storage device 12 is not less than the lower limit state of charge, the control device C determines that the condition for switching to the connected state has been satisfied if the set time has been reached, and even if the set time has not been reached, the control device C determines that the condition for switching to the connected state has been satisfied if the state of charge of the power storage device 12 is less than the lower limit state of charge.

(2)

The first and second embodiments describe examples of cases in which the control device C causes the linking inverter device 20 to perform power interchange control both when the AC line 11 of one of the local systems 10 that constitute the power supply system S is connected to the power system 1 and when it is not connected to the power system 1 (i.e., both when the local inverter device 13 is being caused to operate in the parallel-off operation mode and when it is being caused to operate in the charging operation mode), but the content of the control that the linking inverter device 20 is caused to perform may be changed. For example, the control device C may perform control such that when the AC line 11 of one of the local systems 10 that constitute the power supply system S is connected to the power system 1, that is to say when the local inverter device 13 of the local system 10A is being caused to operate in the above-described charging operation mode, the amount of power transmitted between two adjacent local systems by the linking inverter device 20 increases as the amount of supplementary power increases. In other words, the control device C may perform control such that the linking inverter device 20 transmits an amount of power determined by a function of the amount of supplementary power P1.

(3)

Although an example of the configuration of the power supply system S3 of the present invention is shown in FIG. 4 in the third embodiment, the configuration of the power supply system S3 can be changed appropriately. For example, although FIG. 4 shows an example in which the charging inverter device 3 is connected to the local system 10A, the charging inverter device 3 may be connected to the local system 10B. Alternatively, a configuration is possible in which separate charging inverter devices 3 are connected to multiple local systems 10.

(4)

The third embodiment describes an example of the case in which the condition for starting charging is that the state of charge of the power storage device 12 of the local system 10 that is connected to the power system 1 via the charging inverter device 3 is less than lower limit state of charge, but the content of the condition for starting charging can be changed appropriately. For example, whether or not a set time has been reached may be used as the condition for starting charging. In other words, if the set time has been reached, the control device C may determine that the condition for starting charging has been satisfied, and cause the charging inverter device 3 to operate in the charging operation mode. In this way, by determining that the condition for starting charging has been satisfied when the set time is reached, it is possible to periodically charge the power storage device 12 with supplementary power received from the power system 1 at the set time. For example, if the set time is set before a time period in which power demand rises in a day, it is possible to raise the amount of power that can be supplied to the power consumers D before the time period in which power demand rises.

Furthermore, also regarding the amount of supplementary power: P1 that the charging inverter device 3 is to receive from the power system 1, this amount may be set using a method different from the third embodiment. For example, in the case of determining that the condition for starting charging has been satisfied if a set time has been reached as in this other embodiment, the state of charge of the power storage device 12 of the local system 10A can be any of various values when the condition for starting charging is satisfied, and therefore the amount of supplementary power: P1 that the charging inverter device 3 is to receive from the power system 1 may be changed according to the state of charge. Specifically, upon determining that the condition for starting charging has been satisfied, the control device C may change the amount of supplementary power: P1 that the charging inverter device 3 is to receive from the power system 1 in the charging operation mode in accordance with the state of charge of the power storage device 12 of the local system 10A that is connected to the power system 1 via the charging inverter device 3.

For example, upon determining that the condition for starting charging has been satisfied, the control device C detects the state of charge of the power storage device 12 of the local system 10A that is connected to the power system 1 via the charging inverter device 3. The control device C then causes the charging inverter device 3 to operate such that the lower the state of charge of the power storage device 12 is, the greater the amount of supplementary power: P1 that is to be received from the power system 1 is. For example, the control device C can cause the charging inverter device 3 to operate in the charging operation mode such that, if the state of charge of the power storage device 12 is greater than or equal to 50% of full charge, the supplementary power: P1 to be received from the power system 1 is set to 30% of the rated capacity of the charging inverter device 3, and power supply is received from the power system 1, and such that, if the state of charge of the power storage device 12 is less than 50% of full charge, the supplementary power: P1 to be received from the power system 1 is set to 50% of the rated capacity of the charging inverter device 3, and power supply is received from the power system 1.

Alternatively, in the case where a natural energy power generation device whose power generation changes according to the weather is included in a local system 10 as the power generation device 15, the control device C may change the condition for starting charging according to weather information predicted for the future (e.g., the next day). The third embodiment describes an example of the case in which the condition for starting charging is that the state of charge of the power storage device 12 is less than a predetermined lower limit state of charge, but the condition for starting charging can be substantially changed by changing the magnitude of the lower limit state of charge, for example. Examples of a natural energy power generation device include a solar power generator whose power generation changes according to weather conditions such as "sunny", "cloudy", and "rainy", and a wind power generator whose power generation changes according to weather conditions such as wind speed and the duration for which the wind is blowing.

Specifically, if a solar power generator is connected as the power generation device 15 to the AC line 11 of at least one local system 10 among the multiple local systems 10, the control device C acquires weather information predicted for the future via a communication network (not shown) or the like, and changes the condition for starting charging by changing the magnitude of the lower limit state of charge according to the weather information. To give one example, if the weather condition predicted for the next day is sunny (i.e., if a large rise in the state of charge of the power storage device 12 can be expected), the control device C sets the lower limit state of charge to 50% of the full charge of the power storage device 12, and determines that the condition for starting charging has been satisfied if the state of charge of the power storage device 12 of the local system 10 falls to less than 50% of full charge. Furthermore, if the weather condition predicted for the next day is cloudy (i.e., if a slight rise in the state of charge of the power storage device 12 can be expected), the control device C sets the lower limit state of charge to 60% of the full charge of the power storage device 12, and determines that the condition for starting charging has been satisfied if the state of charge of the power storage device 12 of the local system 10 falls to less than 60% of full charge. Also, if the weather condition predicted for the next day is rainy (i.e., if almost no rise in the state of charge of the power storage device 12 can be expected), the control device C can make a change so as to set the lower limit state of charge to 80% of the full charge of the power storage device 12, and determine that the condition for starting charging has been satisfied if the state of charge of the power storage device 12 of the local system 10 falls to less than 80% of full charge.

Alternatively, a variation is possible in which the control device C determines that the condition for starting charging has been satisfied if the total of the actual states of charge of the power storage devices 12 of the local systems 10 that constitute the power supply system S3 is less than a predetermined percentage (e.g., less than 50%) of the total state of charge when all of the power storage devices 12 are fully charged.

Alternatively, a variation is possible in which the control device C determines that the condition for starting charging has been satisfied if the electric power unit price of purchased electric power when receiving a supply of electric power from the power system 1 is less than a set unit price.

Furthermore, the control device C may employ a combination of the switching conditions described above. For example, the satisfaction of either the condition that the state of charge of the power storage device 12 of the local system 10 that can be connected to the power system 1 via the charging inverter device 3 is less than the lower limit state of charge or the condition that the set time has been reached may be used by the control device C as the condition for starting charging. In this case, even if the state of charge of the power storage device 12 is not less than the lower limit state of charge, the control device C determines that the condition for starting charging has been satisfied if the set time has been reached, and even if the set time has not been reached, the control device C determines that the condition for starting charging has been satisfied if the state of charge of the power storage device 12 is less than the lower limit state of charge.

(5)

The third embodiment describes an example of the case in which the control device C causes the linking inverter device 20 to perform power interchange control both when the charging inverter device 3 is being caused to operate in the charging operation mode and when it is not being caused to operate in the charging operation mode, but the content of the control that the linking inverter device 20 is caused to perform may be changed. For example, the control device C may perform control such that when the charging inverter device 3 is being caused to operate in the charging operation mode, that is to say when the local system 10 is receiving a supply of the supplementary power: P1 from the power system 1, the amount of power transmitted between two adjacent local systems by the linking inverter device 20 increases as the amount of supplementary power increases. In other words, the control device C may perform control such that the linking inverter device 20 transmits an amount of power determined by a function of the amount of supplementary power P1.

(6)

Although an example of the configuration of the power supply system S4 of the present invention is shown in FIG. 6 in the fourth embodiment, the configuration of the power supply system S4 can be changed appropriately. For example, although FIG. 6 shows an example in which the power conversion device 4 is connected to the AC line 11 of the local system 10A, the power conversion device 4 may be connected to the AC line 11 of the local system 10B. Alternatively, a configuration is possible in which separate power conversion devices 4 are connected to multiple local systems 10.

(7)

The fourth embodiment describes an example of the case in which the condition for starting supplementation is that the state of charge of the power storage device 12 of the local system 10 that is connected to the power system 1 via the power conversion device 4 is less than lower limit state of charge, but the content of the condition for starting supplementation can be changed appropriately. For example, whether or not a set time has been reached may be used as the condition for starting supplementation. In other words, if the set time has been reached, the control device C may determine that the condition for starting supplementation has been satisfied, and cause the power conversion device 4 to operate in the supplementation operation mode. In this way, by determining that the condition for starting supplementation has been satisfied when the set time is reached, it is possible to periodically charge the power storage device 12 with supplementary power received from the power system 1 at the set time. For example, if the set time is set before a time period in which power demand rises in a day, it is possible to raise the amount of power that can be supplied to the power consumers D before the time period in which power demand rises.

Furthermore, also regarding the amount of supplementary power: P1 that the power conversion device 4 is to receive from the power system 1, this amount may be set using a method different from the fourth embodiment. For example, in the case of determining that the condition for starting supplementation has been satisfied if a set time has been reached as in this other embodiment, the state of charge of the power storage device 12 of the local system 10A can be any of various values when the condition for starting supplementation is satisfied, and therefore the amount of supplementary power: P1 that the power conversion device 4 is to receive from the power system 1 may be changed according to the state of charge. Specifically, upon determining that the condition for starting supplementation has been satisfied, the control device C may change the amount of supplementary power: P1 that the power conversion device 4 is to receive from the power system 1 in the supplementation operation mode in accordance with the state of charge of the power storage device 12 of the local system 10A that is connected to the power system 1 via the power conversion device 4.

For example, upon determining that the condition for starting supplementation has been satisfied, the control device C detects the state of charge of the power storage device 12 of the local system 10A that is connected to the power system 1 via the power conversion device 4. The control device C then causes the power conversion device 4 to operate such that the lower the state of charge of the power storage device 12 is, the greater the amount of supplementary power: P1 that is to be received from the power system 1 is. For example, the control device C can cause the power conversion device 4 to operate in the supplementation operation mode such that, if the state of charge of the power storage device 12 is greater than or equal to 50% of full charge, the supplementary power: P1 to be received from the power system 1 is set to 30% of the rated capacity of the power conversion device 4, and power supply is received from the power system 1, and such that, if the state of charge of the power storage device 12 is less than 50% of full charge, the supplementary power: P1 to be received from the power system 1 is set to 50% of the rated capacity of the power conversion device 4, and power supply is received from the power system 1.

Alternatively, in the case where a natural energy power generation device whose power generation changes according to the weather is included in a local system 10 as the power generation device 15, the control device C may change the condition for starting supplementation according to weather information predicted for the future (e.g., the next day). The fourth embodiment describes an example of the case in which the condition for starting supplementation is that the state of charge of the power storage device 12 is less than a predetermined lower limit state of charge, but the condition for starting supplementation can be substantially changed by changing the magnitude of the lower limit state of charge, for example. Examples of a natural energy power generation device include a solar power generator whose power generation changes according to weather conditions such as "sunny", "cloudy", and "rainy", and a wind power generator whose power generation changes according to weather conditions such as wind speed and the duration for which the wind is blowing.

Specifically, if a solar power generator is connected as the power generation device 15 to the AC line 11 of at least one local system 10 among the multiple local systems 10, the control device C acquires weather information predicted for the future via a communication network (not shown) or the like, and changes the condition for starting supplementation by changing the magnitude of the lower limit state of charge according to the weather information. To give one example, if the weather condition predicted for the next day is sunny (i.e., if a large rise in the state of charge of the power storage device 12 can be expected), the control device C sets the lower limit state of charge to 50% of the full charge of the power storage device 12, and determines that the condition for starting supplementation has been satisfied if the state of charge of the power storage device 12 of the local system 10 falls to less than 50% of full charge. Furthermore, if the weather condition predicted for the next day is cloudy (i.e., if a slight rise in the state of charge of the power storage device 12 can be expected), the control device C sets the lower limit state of charge to 60% of the full charge of the power storage device 12, and determines that the condition for starting supplementation has been satisfied if the state of charge of the power storage device 12 of the local system 10 falls to less than 60% of full charge. Also, if the weather condition predicted for the next day is rainy (i.e., if almost no rise in the state of charge of the power storage device 12 can be expected), the control device C can make a change so as to set the lower limit state of charge to 80% of the full charge of the power storage device 12, and determine that the condition for starting supplementation has been satisfied if the state of charge of the power storage device 12 of the local system 10 falls to less than 80% of full charge.

Alternatively, a variation is possible in which the control device C determines that the condition for starting supplementation has been satisfied if the total of the actual states of charge of the power storage devices 12 of the local systems 10 that constitute the power supply system S4 is less than a predetermined percentage (e.g., less than 50%) of the total state of charge when all of the power storage devices 12 are fully charged.

Alternatively, a variation is possible in which the control device C determines that the condition for starting supplementation has been satisfied if the electric power unit price of purchased electric power when receiving a supply of electric power from the power system 1 is less than a set unit price.

Furthermore, the control device C may employ a combination of the switching conditions described above. For example, the satisfaction of either the condition that the state of charge of the power storage device 12 of the local system 10 that can be connected to the power system 1 via the power conversion device 4 is less than the lower limit state of charge or the condition that the set time has been reached may be used by the control device C as the condition for starting supplementation. In this case, even if the state of charge of the power storage device 12 is not less than the lower limit state of charge, the control device C determines that the condition for starting supplementation has been satisfied if the set time has been reached, and even if the set time has not been reached, the control device C determines that the condition for starting supplementation has been satisfied if the state of charge of the power storage device 12 is less than the lower limit state of charge.

(8)

The fourth embodiment describes an example of the case in which the control device C causes the linking inverter device 20 to perform power interchange control both when the power conversion device 4 is being caused to operate in the supplementation operation mode and when it is not being caused to operate in the supplementation operation mode, but the content of the control that the linking inverter device 20 is caused to perform may be changed. For example, the control device C may perform control such that when the power conversion device 4 is being caused to operate in the supplementation operation mode, that is to say when the local system 10 is receiving a supply of the supplementary power: P1 from the power system 1, the amount of power transmitted between two adjacent local systems by the linking inverter device 20 increases as the amount of supplementary power increases. In other words, the control device C may perform control such that the linking inverter device 20 transmits an amount of power determined by a function of the amount of supplementary power P1.

(9)

The fourth embodiment describes an example in which the power conversion device 4 is configured so as to have the AC/DC conversion unit 4a, the DC/AC conversion unit 4b, and the DC connection unit 4c that connects these two units, but it is possible to use a power conversion device 4 that has another configuration. For example, the power conversion device 4 may be configured using a direct AC/AC conversion circuit such as a matrix converter that directly converts AC power into AC power having a desired voltage and frequency without using a DC unit.

The invention claimed is:

1. A power supply system comprising a plurality of local systems that each include an AC line to which a plurality of power consumers are connected, a power storage device, and a local inverter device that connects the power storage device and the AC line, comprising
    a linking inverter device that connects the power storage device of one local system and the AC line of another local system between the local systems such that the plurality of local systems are electrically connected in series, the power supply system further comprising:
    an interrupting device capable of switching the AC line of one local system among the plurality of local systems and an external power system that is separate from the plurality of local systems to one of a connected state and a disconnected state; and
    a control device capable of controlling operation of the local inverter devices, the linking inverter device, and the interrupting device,
    wherein when the AC line of the local system that can be connected to the external power system via the interrupting device and the external power system are in the disconnected state, the control device causes the local inverter device of each of the plurality of local systems to operate in a disconnected operation mode in which control is performed such that a voltage of power on the AC line is at a target voltage and such that a frequency of power on the AC line is at a target frequency determined according to a state of charge of the power storage device, and
    wherein the power supply system is configured such that when the control device determines that a condition for switching to the connected state has been satisfied, with respect to the local system that can be connected to the external power system via the interrupting device, the control device stops operation of the local inverter device in the disconnected operation mode and causes a switch to the connected state by operating the interrupting device, and thereafter causes the local inverter device to operate in a charging operation mode used in charging the power storage device with supplementary power received from the external power system.

2. The power supply system according to claim 1, wherein the control device determines that the condition for switching to the connected state has been satisfied once a set time is reached.

3. The power supply system according to claim 1, wherein the control device determines that the condition for switching to the connected state has been satisfied once the state of charge of the power storage device of the local system that can be connected to the external power system via the interrupting device is less than a lower limit state of charge.

4. The power supply system according to claim 1, wherein the control device changes the amount of supplementary power that the local inverter device is to receive from the external power system in the charging operation mode in accordance with a magnitude of the state of charge of the power storage device of the local system that can be connected to the external power system via the interrupting device at the time when the control device determined that the condition for switching to the connected state has been satisfied.

5. The power supply system according to claim 1, wherein when the local inverter device is being caused to operate in the charging operation mode, the control device increases an amount of power transmitted by the linking inverter device between two adjacent local systems as the amount of supplementary power increases.

6. The power supply system according to claim 1, wherein with respect to two mutually adjacent local systems that are electrically connected via one linking inverter device, the control device controls operation of the linking inverter device such that, based on the target frequencies determined according to the states of charge of the respective power storage devices, electric power is transmitted from the local system in which the state of charge of the power storage device is relatively higher to the local system in which the state of charge of the power storage device is relatively lower.

7. The power supply system according to claim 3,
    wherein a natural energy power generation device whose power generation changes according to the weather is connected to the AC line of at least one local system among the plurality of local systems, and
    the control device changes the magnitude of the lower limit state of charge according to the weather predicted for the future.

8. A power supply system comprising a plurality of local systems that each include an AC line to which a plurality of power consumers are connected, a power storage device, and a local inverter device that connects the power storage device and the AC line, comprising
    a linking inverter device that connects the power storage device of one local system and the AC line of another local system between the local systems such that the plurality of local systems are electrically connected in series, the power supply system further comprising
    a charging inverter device that connects the power storage device of one local system among the plurality of local systems and an external power system that is separate from the plurality of local systems, and can be used in charging of the power storage device with supplementary power received from the external power system; and
    a control device that controls operation of the local inverter devices, the linking inverter device, and the charging inverter device,
    wherein the control device controls the local inverter device of each of the plurality of local systems such that a voltage of power on the AC line is at a target voltage and such that a frequency of power on the AC line is at a target frequency determined according to a state of charge of the power storage device, and
    wherein the power supply system is configured such that when the control device determines that a condition for starting charging has been satisfied, the control device causes the charging inverter device to operate in a charging operation mode in which the supplementary power is received from the external power system and used to charge the power storage device.

9. The power supply system according to claim 8, wherein the control device determines that the condition for starting charging has been satisfied once a set time is reached.

10. The power supply system according to claim 8, wherein the control device determines that the condition for starting charging has been satisfied once the state of charge of the power storage device of the local system connected to the external power system via the charging inverter device is less than a lower limit state of charge.

11. The power supply system according to claim 8, wherein the control device changes the amount of supplementary power that the charging inverter device is to receive from the external power system in the charging operation mode in accordance with a magnitude of the state of charge of the power storage device of the local system connected to the external power system via the charging inverter device at the time when the control device determined that the condition for starting charging has been satisfied.

12. The power supply system according to claim 8, wherein when the charging inverter device is being caused to operate in the charging operation mode, the control device increases an amount of power transmitted by the linking inverter device between two adjacent local systems as the amount of supplementary power increases.

13. The power supply system according to claim 10,
wherein a natural energy power generation device whose power generation changes according to the weather is connected to the AC line of at least one local system among the plurality of local systems, and
the control device changes the magnitude of the lower limit state of charge according to the weather predicted for the future.

14. A power supply system comprising a plurality of local systems that each include an AC line to which a plurality of power consumers are connected, a power storage device, and a local inverter device that connects the power storage device and the AC line, comprising
a linking inverter device that connects the power storage device of one local system and the AC line of another local system between the local systems such that the plurality of local systems are electrically connected in series, the power supply system further comprising
a power conversion device that connects the AC line of one local system among the plurality of local systems and an external power system that is separate from the plurality of local systems; and
a control device capable of controlling operation of the local inverter devices, the linking inverter device, and the power conversion device,
wherein the control device controls the local inverter device of each of the plurality of local systems such that a voltage of power on the AC line is at a target voltage and such that a frequency of power on the AC line is at a target frequency determined according to a state of charge of the power storage device, and
wherein the power supply system is configured such that when the control device determines that a condition for starting supplementation has been satisfied, the condition for starting supplementation being for starting supply of supplementary power received from the external power system to the AC line of the one local system, the control device causes the power conversion device to operate in a supplementation operation mode in which supplementary power is received from the external power system, the frequency of the supplementary power is adjusted to the target frequency, and the adjusted supplementary power is supplied to the AC line.

15. The power supply system according to claim 14, wherein the control device determines that the condition for starting supplementation has been satisfied once a set time is reached.

16. The power supply system according to claim 14, wherein the control device determines that the condition for starting supplementation has been satisfied once the state of charge of the power storage device of the local system connected to the external power system via the power conversion device is less than a lower limit state of charge.

17. The power supply system according to claim 14, wherein the power conversion device has an AC/DC conversion unit that converts the supplementary power supplied from the external power system into desired DC power, a DC/AC conversion unit that converts the DC power generated by the AC/DC conversion unit into desired AC power and supplies the AC power to the AC line, and a DC connection unit that connects the AC/DC conversion unit and the DC/AC conversion unit.

18. The power supply system according to claim 14, wherein the control device changes the amount of supplementary power that the power conversion device is to receive from the external power system in the supplementation operation mode in accordance with a magnitude of the state of charge of the power storage device of the local system connected to the external power system via the power conversion device at the time when the control device determined that the condition for starting supplementation has been satisfied.

19. The power supply system according to claim 14, wherein when the power conversion device is being caused to operate in the supplementation operation mode, the control device increases an amount of power transmitted by the linking inverter device between two adjacent local systems as the amount of supplementary power increases.

20. The power supply system according to claim 16,
wherein a natural energy power generation device whose power generation changes according to the weather is connected to the AC line of at least one local system among the plurality of local systems, and
the control device changes the magnitude of the lower limit state of charge according to the weather predicted for the future.

* * * * *